Aug. 2, 1960 C. C. RAYBURN ET AL 2,947,247

PATTERN PRINTER

Filed June 27, 1956 17 Sheets-Sheet 1

INVENTORS
Charles C. Rayburn
Herman A. Schmidt
Wallace N. Knutsen
BY
Donald P. Smith
Attorney

PATTERN PRINTER

Filed June 27, 1956 17 Sheets-Sheet 2

INVENTORS
Charles C. Rayburn
Herman A. Schmidt
Wallace N. Knutsen
BY
Donald P. Smith
Attorney

PATTERN PRINTER

Filed June 27, 1956 17 Sheets-Sheet 3

INVENTORS
Charles C. Rayburn
Herman A. Schmidt
BY Wallace N. Knutsen
Donald P. Smith
Attorney INVENTORS
Charles C. Rayburn
Herman A. Schmidt
Wallace N. Knutsen
BY
Donald P. Smith
Attorney INVENTORS
Charles C. Rayburn
Herman A. Schmidt
Wallace N. Knutsen
BY
Donald P. Smith
Attorney Aug. 2, 1960 C. C. RAYBURN ET AL 2,947,247

PATTERN PRINTER

Filed June 27, 1956 17 Sheets-Sheet 6

INVENTORS
Charles C. Rayburn
Herman A. Schmidt
Wallace N. Knutsen

BY Donald P. Smith
Attorney

Aug. 2, 1960 C. C. RAYBURN ET AL 2,947,247

PATTERN PRINTER

Filed June 27, 1956 17 Sheets-Sheet 7

INVENTORS
Charles C. Rayburn
Herman A. Schmidt
Wallace N. Knutsen
BY
Donald P. Smith
Attorney INVENTORS
Charles C. Rayburn
Herman A. Schmidt
BY Wallace N. Knutsen
Donald P. Smith
Attorney

PATTERN PRINTER

Filed June 27, 1956 17 Sheets-Sheet 9

INVENTORS
Charles C. Rayburn
Herman A. Schmidt
Wallace N. Knutsen

BY Donald P. Smith
Attorney

Aug. 2, 1960 C. C. RAYBURN ET AL 2,947,247

PATTERN PRINTER

Filed June 27, 1956 17 Sheets-Sheet 10

INVENTORS
Charles C. Rayburn
Herman A. Schmidt
Wallace N. Knutsen

BY Donald P. Smith
Attorney

PATTERN PRINTER

INVENTORS
Charles C. Rayburn
Herman A. Schmidt
Wallace N. Knutsen
BY
Donald P. Smith
Attorney INVENTORS
Charles C. Rayburn
Herman A. Schmidt
Wallace N. Knutsen
BY
Donald P. Smith
Attorney INVENTORS
Charles C. Rayburn
Herman A. Schmidt
Wallace N. Knutsen
BY Donald P. Smith
Attorney Aug. 2, 1960 C. C. RAYBURN ET AL 2,947,247

PATTERN PRINTER

Filed June 27, 1956 17 Sheets-Sheet 14

INVENTORS
Charles C. Rayburn
Herman A. Schmidt
Wallace N. Knutsen
BY
Donald P. Smith
Attorney

PATTERN PRINTER

INVENTORS
Charles C. Rayburn
Herman A. Schmidt
Wallace N. Knutsen
BY
Donald P. Smith
Attorney INVENTORS
Charles C. Rayburn
Herman A. Schmidt
Wallace N. Knutsen
BY Donald P. Smith
Attorney INVENTORS
Charles C. Rayburn
Herman A. Schmidt
Wallace N. Knutsen
BY
Donald P. Smith
Attorney United States Patent Office 2,947,247
Patented Aug. 2, 1960

2,947,247

PATTERN PRINTER

Charles C. Rayburn, Alexandria, Va., Herman A. Schmidt, Washington, D.C., and Wallace N. Knutsen, Alexandria, Va., assignors, by mesne assignments, to Illinois Tool Works, Chicago, Ill., a corporation of Illinois Filed June 27, 1956, Ser. No. 594,184

17 Claims. (Cl. 101—126)

This invention relates to improvements in a machine for automatically spray printing circuit patterns on wafers for use with modules and similar assemblies.

One of the objects of the invention is to provide a machine embodying means for automatically receiving and positioning ceramic wafers with their side walls adjacent stencils provided with patterns for defining printed circuits which are to be deposited thereon by automatic spray machines.

Another object of the invention is to provide means for alternately positioning and securing the opposite side faces of a ceramic wafer in proper association with its stencil whereby the spray from the spray gun will be properly applied and associated with the surfaces.

Another object of the invention is to provide means for cleaning the wafer carrying means and its associated parts including the stencils and for reclaiming the sprayed material recovered through the cleaning operation.

A further feature of the invention resides in the provision of drying means which automatically functions to recondition the apparatus after the washing operation.

More specifically the invention comprehends the use of interchangeable and replaceable stencils for providing the patterns on the ceramic wafers, means being provided for convenient application and interchange of the stencil parts.

Other objects reside in the automatic feeding of the wafers and control of the spraying and cleaning mechanism, the controls being sequentially controlled for continuous operation.

These and further objects of the invention will more clearly hereinafter appear by reference to the accompanying drawings forming a part of the instant application and wherein like characters of reference designate corresponding parts throughout the several views, in which:

Fig. 19 is an enlarged partial section through the carrier wheel;

Figure 1:
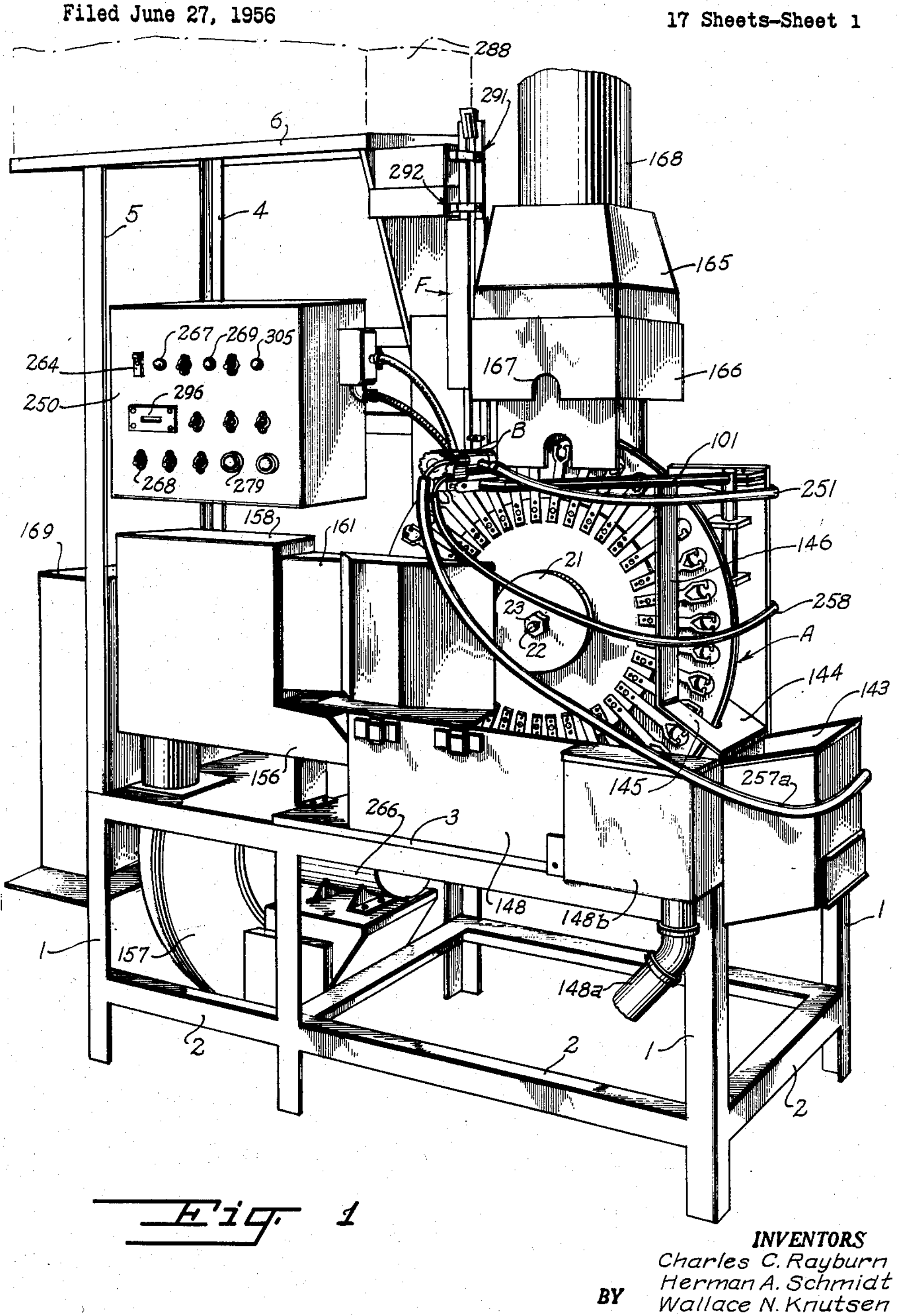
Fig. 1 is a perspective view of the invention.

The present assembly includes a supporting structure embodying vertical standards 1 connected by horizontal braces 2 which support a front platform 3 and a rear frame. The rear frame includes the rear uprights 4 and the front vertical uprights 5 terminating at an upper frame 6. This framing supports cross braces and platforms which will be hereinafter later identified.

The main feature of the invention is a rotary work holder in the form of a carrier wheel generally indicated by reference character A mounted on the shaft 10 supported in bearings 11 and 12 mounted on plate 14 driven by belt 14$^a$ from the power shaft 15 rotated by motor 16 and worm gear 17. The belt 14$^a$ is driven by pulley 18 on the outer end of the motor driven shaft 15 and drives pulley 19 on the outer end of the wheel shaft 10. The pulleys 18 and 19 are constructed for association with the drive belt 14$^a$ which is of the conventional V-type. The wheel carrier A is clamped on the hub 20 on the inner end of driven shaft 10 by the end plate 21 secured to the end of the shaft by bolt 22 and nut 23, this end plate 21 clamping the carrier wheel A against the annular flange 24 of the hub 25 which parts are braced by radially extending webs 26.

Figure 7:
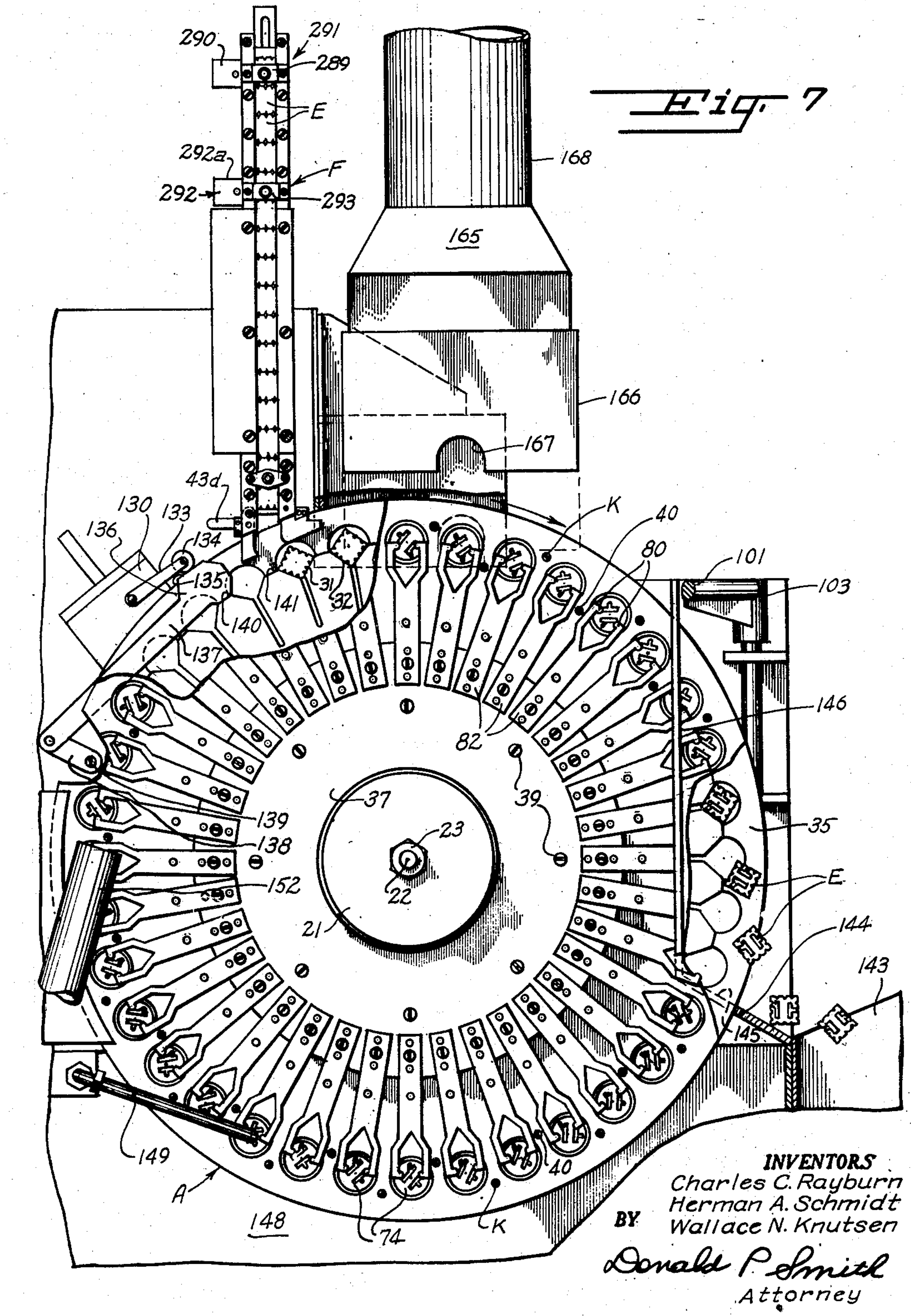
Fig. 7 is an enlarged elevation partly in section showing the carrier wheel taken on line 7—7 of Fig. 6.
Figures 10, 11, 12:
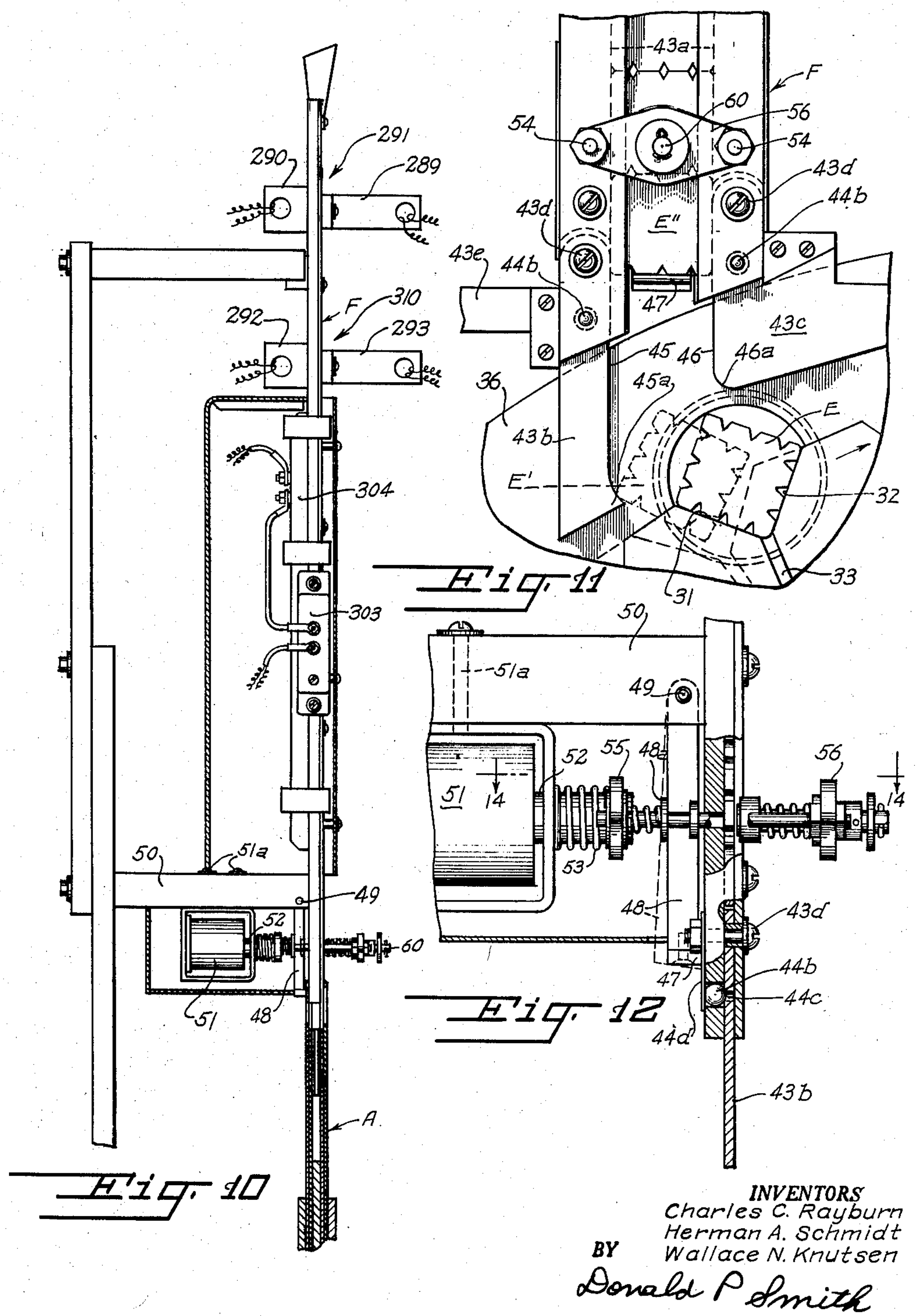
Fig. 10 is a side elevation of the chute partly in section.
Fig. 11 is an enlarged fragmentary elevation of the lower end of the chute.
Fig. 12 is an enlarged view showing the ceramic release mechanism, the parts being in section.

The carrier wheel A is of laminated form (Fig. 19) and includes a medial spacer plate 30 formed with peripheral angular wafer-receiving pockets defined by walls 31 and 32 (Fig. 11) separated by radial slots 33. At each side of the medial plate 30 are the side plates 35 and 36 each formed of laminated sheeting, illustrated as 2-ply. The medial plate 30 and the side plates 35 and 36 are clamped together by the outer disks 37 and 38 and the assembly is secured by the inner screw bolts 39 which extend through the disks 37 and 38 and the plates 30, 35 and 36, and the outer bolts 40 which extend only between the plates 35 and 36. The inner screw bolts 39 have their notched heads facing outwardly to facilitate tightening or disassembly as best shown in Fig. 7. A plurality of openings or windows are formed in the side plates 35 and 36 immediately adjacent the angular seats defined by walls 31 and 32 so that the ceramic wafer positioned in the seat has each of its lateral sides exposed to spray from the spray guns B and C located at opposite sides of the carrying wheel A. Fig. 11 shows one of the ceramics E resting in one of the pockets defined by the walls 31 and 32 with an annular opening in one of the side plates 35 of the wheel illustrated with respect to the ceramic. In Fig. 11 the ceramic E has just been delivered from the feed chute indicated generally at F and this ceramic is shown in dotted lines at E' partially moved toward its seated position as the pockets advance clockwise to the full line position.

Figures 9, 13, 14:
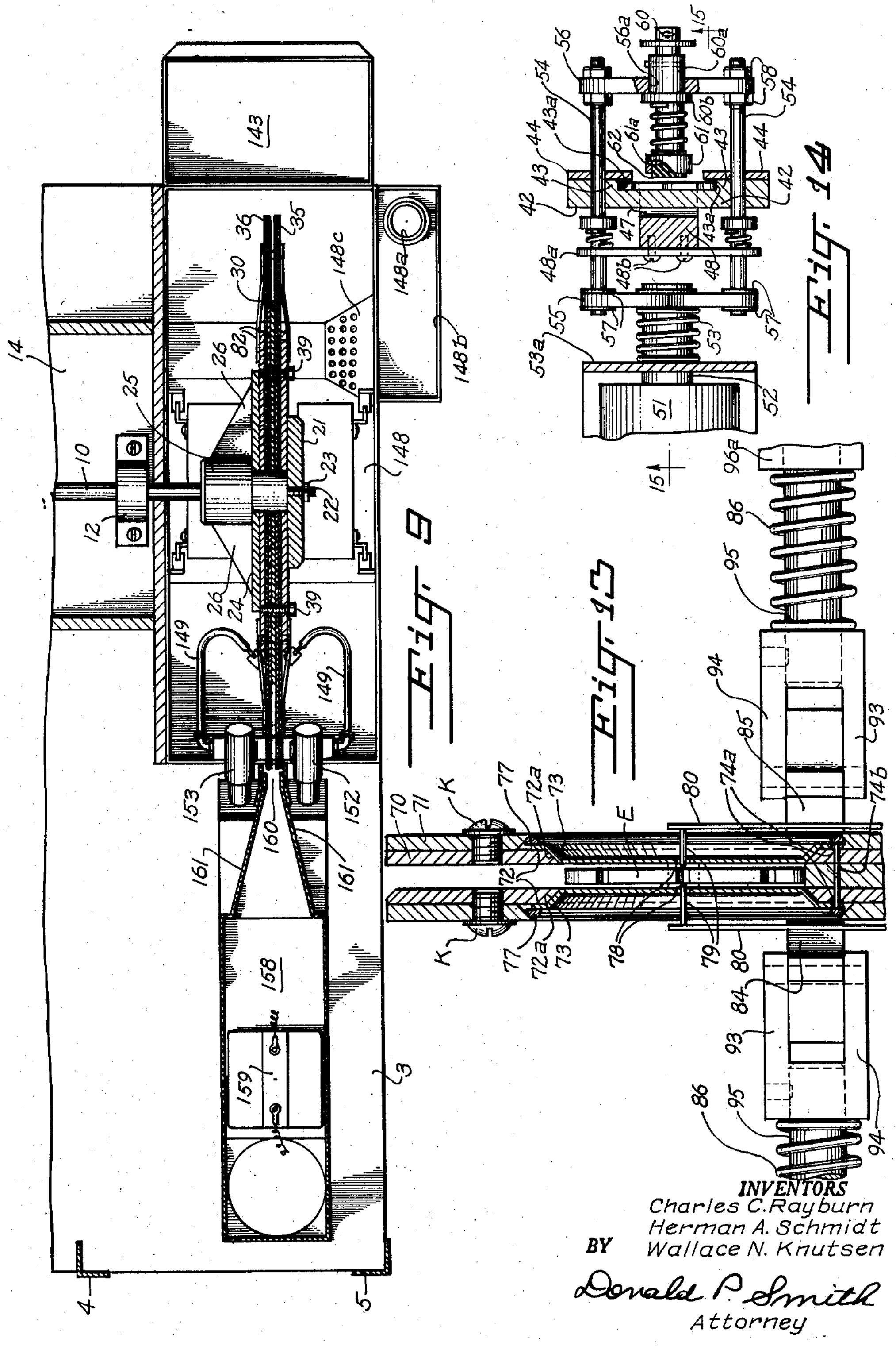
Fig. 13 is an enlarged sectional view on line 13—13 of Fig. 6.
Fig. 14 is an enlarged sectional view taken on line 14—14 of Fig. 12.

The feed chute F is shown in detail in Figs. 10 and 14 and comprises a vertical channelway having a base 42 and side flanges 43, the latter defining the vertical aligned spaced walls $43^a$ which are suitably spaced for receiving and permitting the passage therethrough of ceramic wafers which are illustrated as generally square. These wafers are oriented before being passed into the chute F by proper mechanism indicated by reference character 288, not forming a part of this invention. It is obviously necessary to orient the ceramic wafers as they are placed in the chute F so that the printed circuits to be applied to each side of the ceramic wafers will be properly positioned with respect to the terminal connections, as will be apparent to one skilled in the art.

Side plates 44 are fixed to the outer side faces of the side flanges 43 and extend inwardly to overlie the channelway to hold the ceramic wafers against lateral displacement during their movement. The side flanges 43 of the channelway F are of reduced length to provide for the arrangement of swinging guide members $43^b$ and $43^c$ (Fig. 11), the inner faces 45 and 46 of which define a continuation of the guide faces $43^a$ of the channelway F. The swinging guide members $43^b$ and $43^c$ are pivoted to the channel F by the bolts or pins $43^d$ and are held in their vertical aligned position with respect to associated guide walls $43^a$ by spring pressed balls $44^b$, as shown in Fig. 12. The spring pressed balls $44^b$ engage in recesses $44^c$ in the swinging guide members $43^b$ and $43^c$ and are clamped in their seats to lock these parts against pivotal movement by spring arms $44^d$. By this means the lower swinging guide members $43^b$ and $43^c$ can readily be moved on their pivotal mountings to open the channelway for the discharge of ceramic wafers which might become lodged in the guideway. These swinging guide members $43^b$ and $43^c$ may be provided with handle projections $43^e$ to facilitate their operation. It will be noted that the swinging guide extensions $43^b$ and $43^c$ which define the lower part of the side walls of chute F have their lower inner faces modified to aid in the proper deflection of the wafer discharged from the chute into the recess in the rotating wheel carrier. The chute section $43^b$ extends beneath the chute section $43^c$ and has its inner face 45 at its lower end portion $45^a$ of arcuate form to cause the wafer to be deflected in the direction of the clockwise moving carrier wheel A. The opposite inner face 46 of the guide plate $43^c$ is rounded at its bottom edge $46^a$ to provide clearance for the moving ceramic wafer E.

Figures 15, 16, 17, 20:
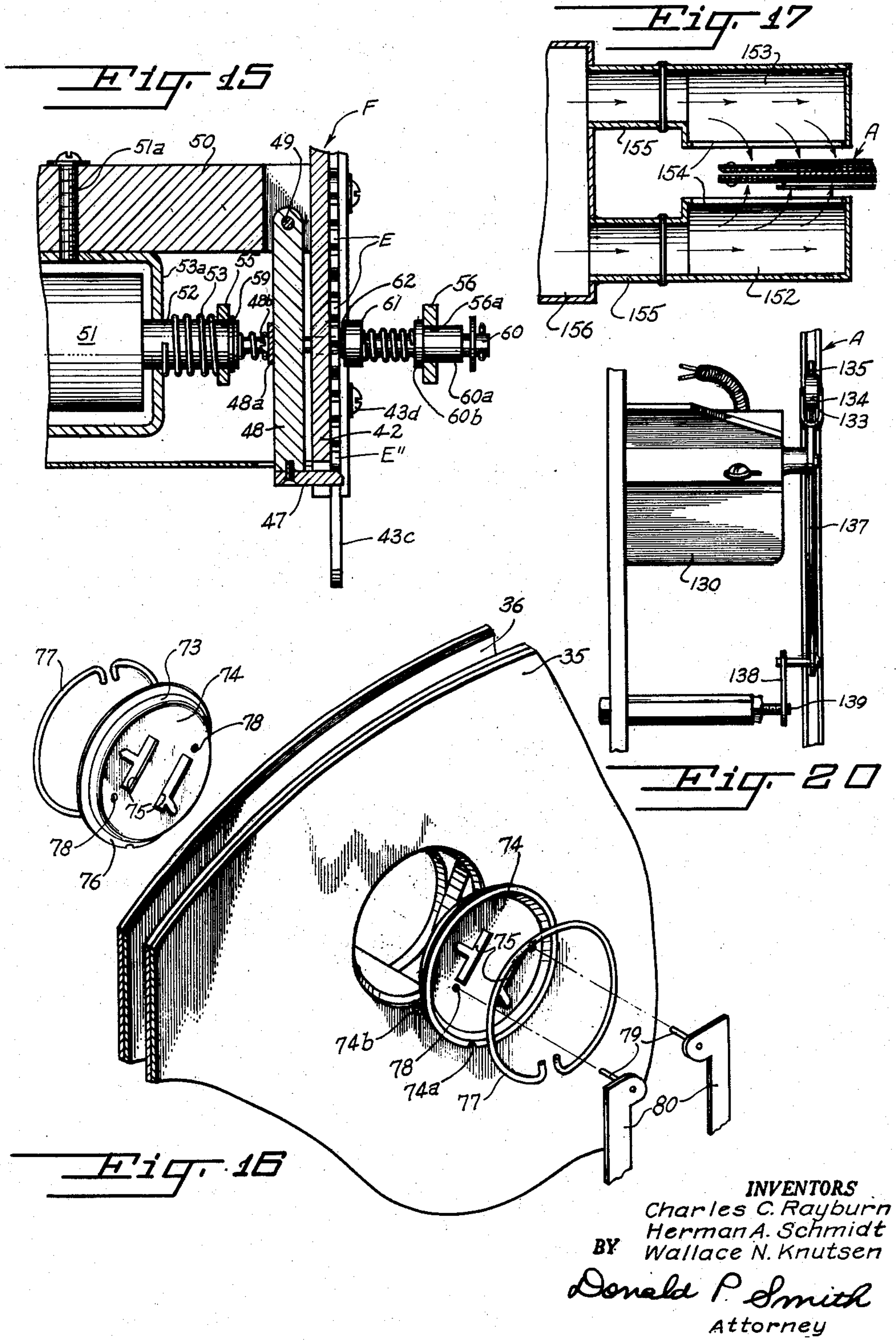
Fig. 15 is a sectional view on line 15—15 of Fig. 14.
Fig. 16 is an exploded view showing the pattern assembly.
Fig. 17 is a section on line 17—17 of Fig. 2.
Fig. 20 is a section on line 20—20 of Fig. 2.

The column of wafers in the chute F is normally supported by the projection 47 carried by the pivoted arm 48 mounted on pivot pin 49 supported by the frame member 50. This arm 48 is actuated by the solenoid 51, the core 52 of which is normally projected by the coil spring 53. This structure is shown in Fig. 15. A cross arm $48^a$ is secured to the arm 48 by screws $48^b$ and the ends of this cross arm are perforated for receiving spaced parallel guide rods 54 which extend through the outer walls of the channel 42 and slide axially therethrough as shown in Fig. 14. The ends of the guide rods 54 are connected at each end by cross arms 55 and 56, the cross arm 55 being clamped by spaced washers 57 on the inner ends of the guide rods 54 while the outer cross arm 56 is clamped between the nuts 58 which are threaded on the outer ends of the guide rods 54. The inner cross arm 55 is formed with a central opening 59 (Fig. 15) which is fixed to the outer end of the core 52 and this cross arm at its junction with the core 52 forms a stop for the outer end of the coil spring 53 on the core. The inner end of the coil spring 53 abuts against the wall $53^a$ of the solenoid housing. The solenoid is shown mounted by screws $51^a$ to the frame member 50, as shown in Fig. 15.

The outer cross arm 56 is formed with a central opening $56^a$ through which a plunger 60 extends, this plunger 60 being provided with a bushing $60^a$ which acts as a bearing mounting the plunger 60 in the cross arm 56. The bushing $60^a$ has an inner annular flange $60^b$ which abuts against the inner face of the cross arm 56. The inner end of the plunger 60 is enlarged as at 61 and formed with the recesses $61^a$ for receiving a rubber pad 62 which upon retraction of the solenoid core 52 is urged inwardly by the cross arm 56 for engaging and supporting all but the bottom wafer. The bottom wafer upon retraction of the core 52 is released by the inward swinging movement of the pivoted arm 48 which retracts the projection 47 and releases the bottom wafer for discharge into the wheel carrier A. As the core 52 is released the spring 53 moves the same outwardly and moves the projection 47 beneath the bottom wafer which has moved downwardly with the outward movement of the pad 62. Obviously the projection 47 supporting the column of wafers from the lowermost wafer functions simultaneously with the clamp pads 62 to release the column of wafers for support solely by the projection 47.

Referring now to the carrying wheel, it will be noted that the side plates 35 and 36, at each side of the spacer plate 30, and beyond the peripheral edge of the spacer plate 30, are of laminated form and illustrated in the present disclosure as consisting of 2-ply sheets of metal suitably secured together by screws K (Fig. 19). It is in these side plates 35 and 36 that the ports or windows for the patterns are formed and by reference to Figs. 13 and 16, it will be seen that the openings forming these ports are of greater diameter in the inner ply at 70 than in the outer ply 71, this structure forming an inner annular shoulder at 72 which is beveled at $72^a$ for receiving the beveled faces 73 of the disk-like patterns 74 shown in Fig. 16. The pattern disk 74 is provided with any suitable predetermined pattern opening as at 75 and the outer marginal edge of the pattern disk is in the form of an offset flange 76, which as shown in Fig. 16, lies against the outer marginal face of the inner sheet 70 about the port openings. The disk-like patterns 74 are clamped into place by the snap rings 77, as shown in Fig. 13, this providing for convenient removal and replacement of the disk-like patterns. To insure the proper positioning of the pattern disks 74 with respect to the ceramic wafer, the disks 74 are notched at $74^a$ for registry with a gauge pin $74^b$. The patterns are also formed with spaced openings 78 for the passage of pressure pins 79 projecting laterally from the extremities 80 of the spring arms 81 of the pressure plates 82. The pins 79 are adapted to pass through the openings 78 in the disk patterns 74 and abut against the wafer which is positioned in transverse alignment therewith. The purpose of these spring arms 81 is to move the ceramic against the patterns and to hold the same against this pattern while the spray coating is being projected through the pattern and onto the ceramic wafer. These spring arms 81 are arranged opposite each window on each side of the feed wheel and are operated by cams 84 and 85 to alternately move and clamp the ceramic wafer against the alternate windows during the spraying operations which are synchronized to take place simultaneously and in timed relation to the traveling of the wheel as will be hereinafter described.

Figure 6:
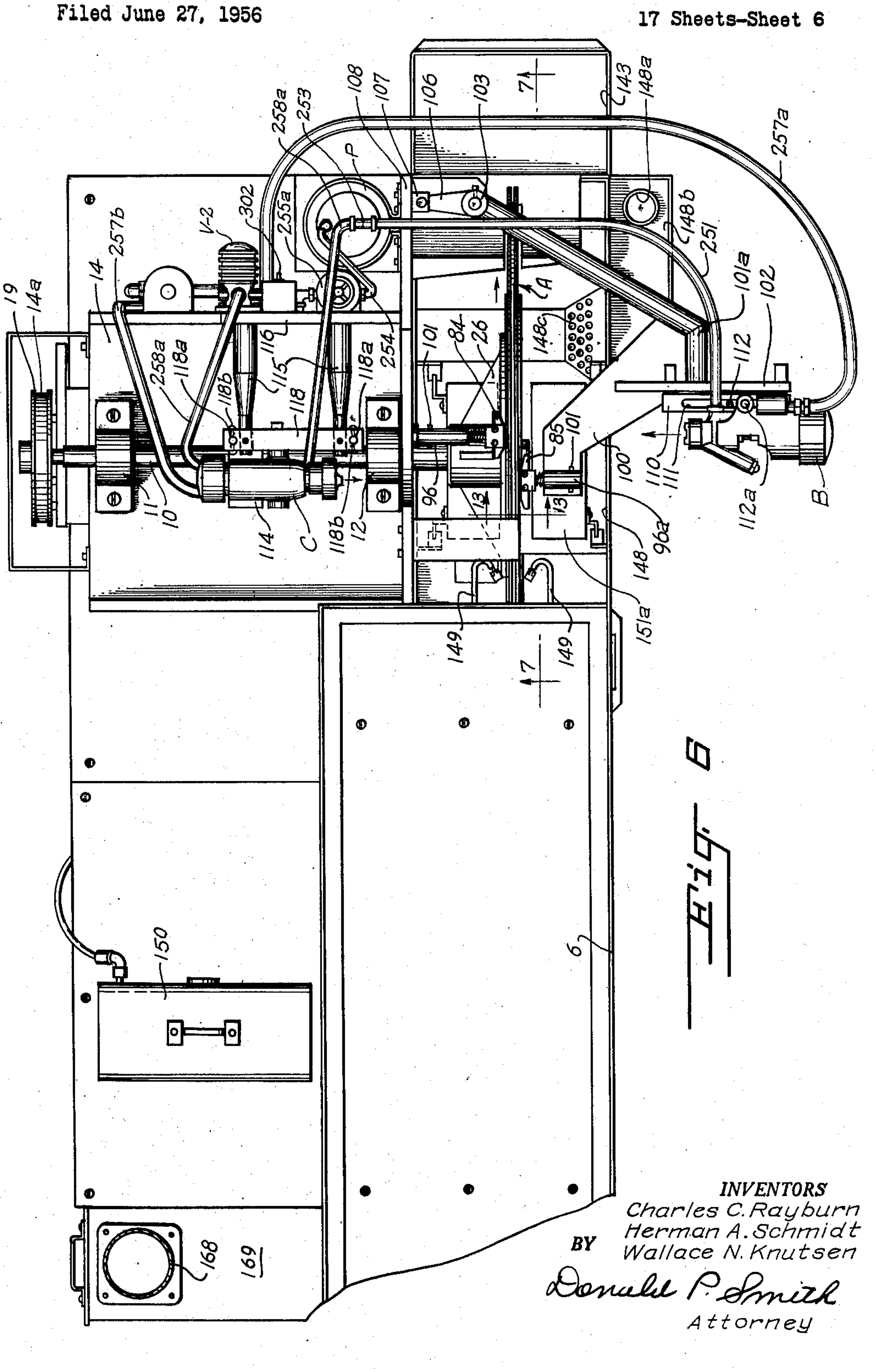
Fig. 6 is a top plan view.

The cams 84 and 85 for actuating the spring arms 81 and the pressure pins 79 carried thereby are shown in Figs. 6 and 13, and it will be noted from Fig. 6 that these cams 84 and 85 are normally positioned under urge of springs 86 into such positions that they will engage the spring arms 81 as the latter are moved by the rotation of their carrying wheel and will shift the wafers alternately from one side to the other for engagement with the patterns 74 at the time of the application of the spray hereto. With reference to Fig. 6 it will be seen that the cam 84 is positioned forwardly of the cam 85, these cams being positioned in axial alignment with the associated spray guns B and C, respectively, it being obvious that the camming of the wafer against its pattern is to be synchronized with the spraying operation so that spray on the ceramic will be clearly defined and limited by the pattern. In Fig. 13 it will be obvious that the cams 84 and 85 are similarly mounted between bifurcated terminals 93 and 94 on the extremities of the rods or plungers 95. The plunger 95 for the cam 84 is supported in a block 96 fixed to a member 99 secured to the frame, while the plunger 95 for the cam 85 is mounted in a block 96a fixed to the frame member 100, mounted on the angular arm 101a which likewise carries the spray gun B. The guide rods or plungers 95 are each provided with cross pins 101 which travel in slots 102 formed in their respective guide blocks. The angular arm 101a is provided with a hub 103 swingably supported on the post 104 and this arm 101a can be locked in its arcuate movement by sets screws 105 to fix the spray gun B and the cam 85 in their operating position. The hub 103 is provided with a horizontal fin 106 which travels between the spaced tracks 107 and tends to support the structure against deviation from its vertical axis. The track 107 is fixed to the wall 108 forming a part of the frame structure. Brackets 109 extending laterally from the wall 108 support the post 104 and this post can be provided with any suitable bearings to furnish proper operation of the parts.

The spray guns B and C are of conventional form, with spray gun B being carried by the swinging arm 101a as heretofore described. This spray gun B is longitudinally slidably mounted on the support 110 to permit adjustment in the direction of the axis of the spray, the adjustment being facilitated by the slot 111 in the mounting and the pins 112 traveling in the slot. A clamp nut 112a locks the parts in this adjustment. A strap 114 embraces the spray gun cylinder and clamps the spray gun B in position on its adjustable mounting.

The spray gun C, as shown in Fig. 6, is mounted on an assembly including the horizontal posts 115 projecting from and supported by the vertical panel 116 of the machine frame. The outer ends 115a of the posts 115 extend through elongated block 117 and support the latter. The block 117 is provided with spaced vertical openings for receiving depending pins 118a from the upper block 118. The pins 118a are locked in the block 117 by set screws 118b and permit the vertical adjustment of the block 118 with respect to the block 117 for vertically adjusting the spray gun C which is mounted thereon. The upper block 118 carrying the pins 118a is provided with an elongated slot 119 for receiving guide blocks 119a extending from the body of the spray gun C to permit the adjustment of spray gun C axially in the direction of its length. A thumb screw 119b locks the spray gun in its adjusted lengthwise position. By this arrangement both of the spray guns are capable of adjustment both vertically and horizontally so that spray from these guns will be properly centered with respect to their work.

The wafers E which are discharged by the automatic mechanism from the chute F into the carrier wheel A, are sprayed by the spray guns B and C through the pattern 74 by means actuated by a switch generally indicated by reference character 130, the micro-switch 130 controlling the several mechanisms as hereinafter to be more fully described. The micro-switch 130 is operated by a lever 133 having a roller 134 engaging the flat face 135 of the enlarged extremity 136 of arm 137, the latter being connected to pivoted link 138 by a pivot 139. The enlarged head 136 has a lower flat face 140 for engaging the spaced flat faces 141, this lower flat face 140 of the head 136 being offset downwardly from the shank 137 so that this shank 137 is alternately lifted for engaging the roller 134 to actuate the switch as the head 136 travels from the spaced flat faces 141 which are separated by the wafer-receiving recesses, as heretofore described. This interrupted movement of the arm 137 intermittently actuates the switch to intermittently cause the functioning of the parts controlled thereby.

As the ceramic wafers are moved across the path of the spray guns B and C, they continue to travel with the wheel in clockwise direction, as shown in Fig. 7, to a position where the ceramics will drop by gravity into the receptacle 143 which has its back face secured to the frame as shown. An inclined plate 144 has a bifurcated inner end portion 145 which straddles the wheel to form a trough for guiding the ceramics into the receptacle 143. Spaced vertical guards or shoulders 146 extend upwardly from the spaced portions 145 of the bifurcation of the chute 144 to prevent splatter of the coating material onto the output chute during operation of the machine.

Figure 3:
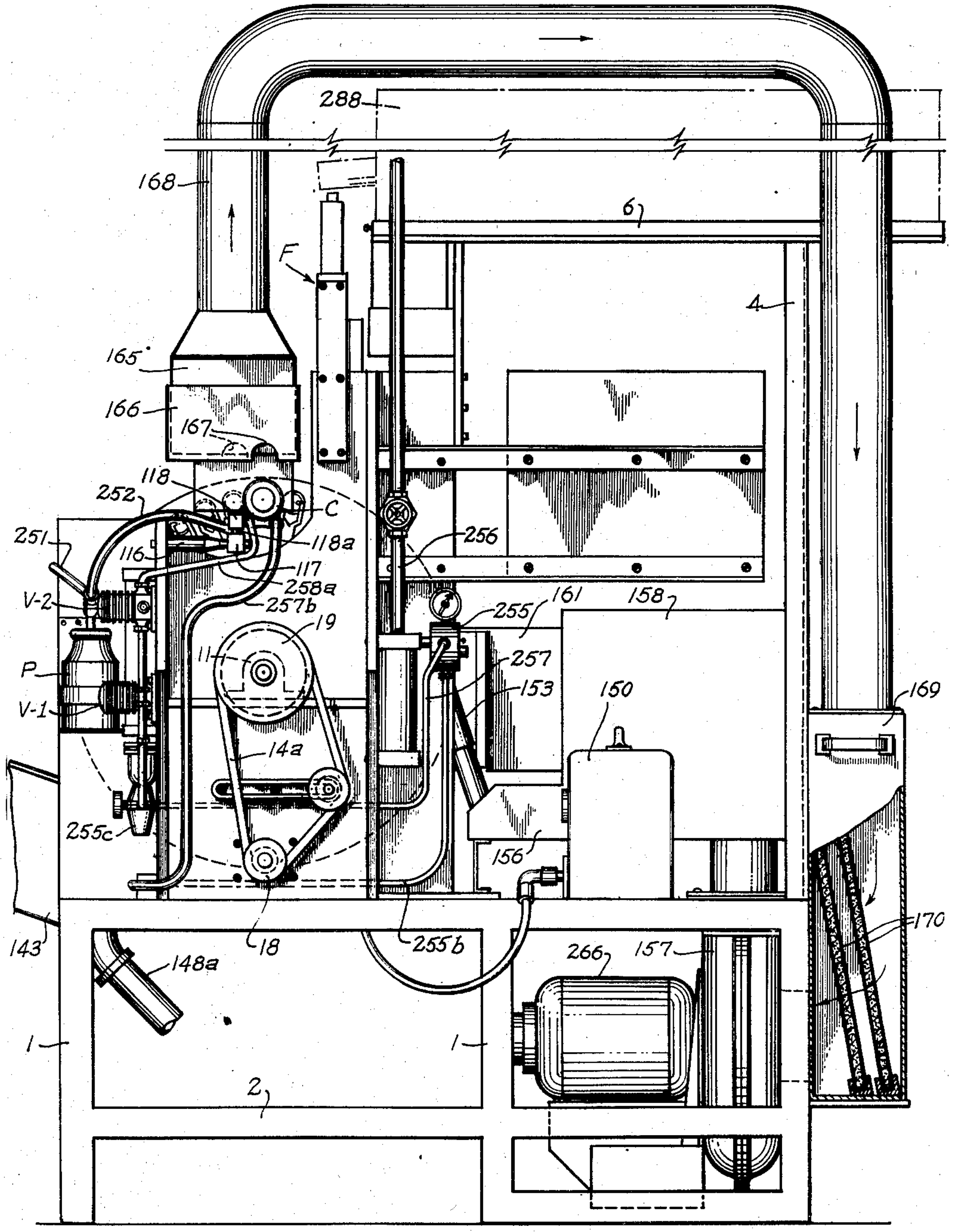
Fig. 3 is a rear elevation partly in section.
Figures 4, 18:
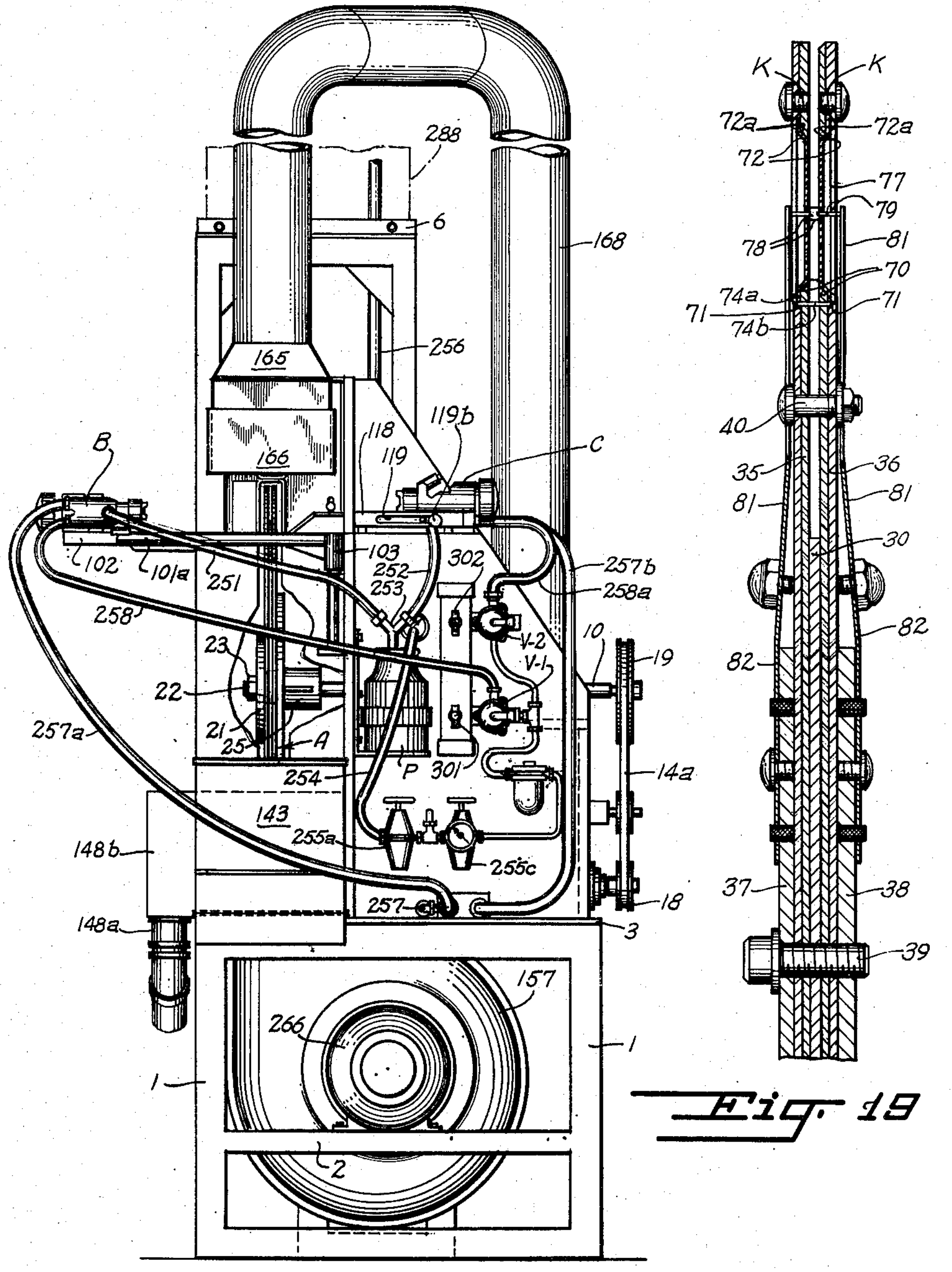
Fig. 4 is an end elevation.
Fig. 18 is an enlarged detail showing the outer spray nozzles.
Figure 5:
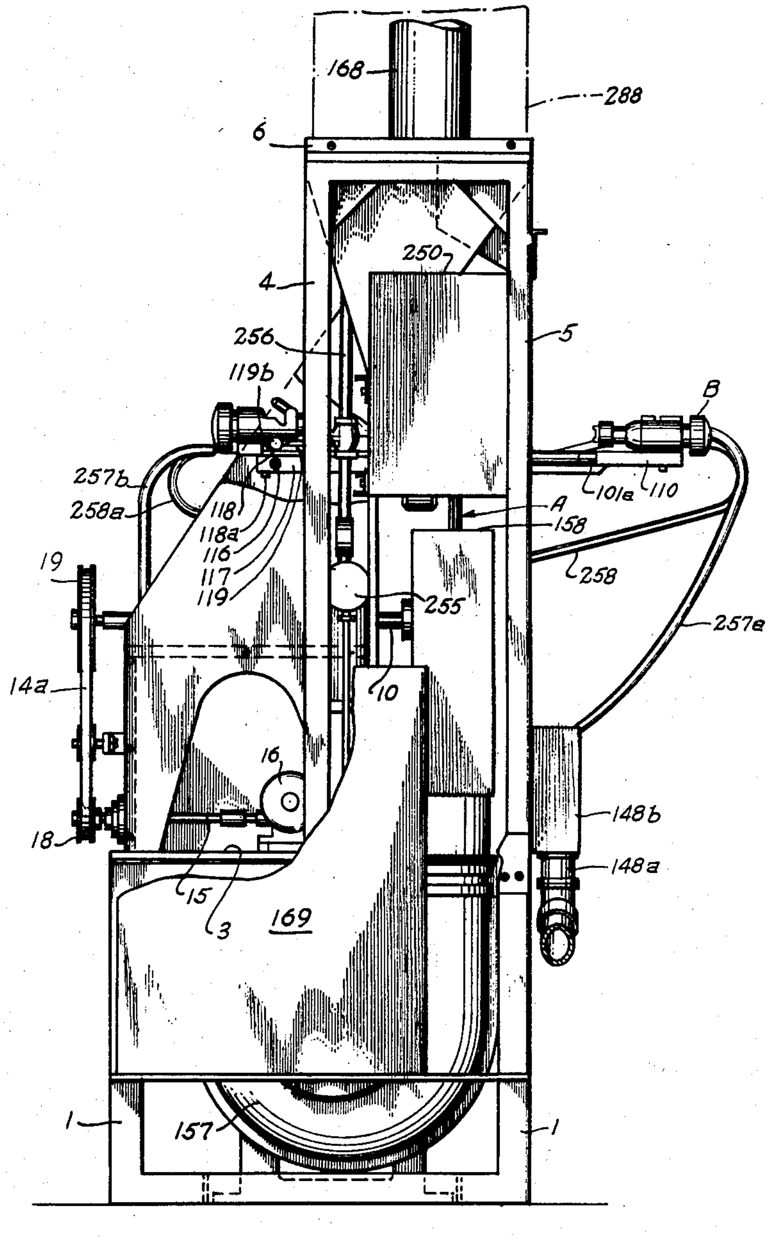
Fig. 5 is the opposite end elevation.
Figures 8, 9:
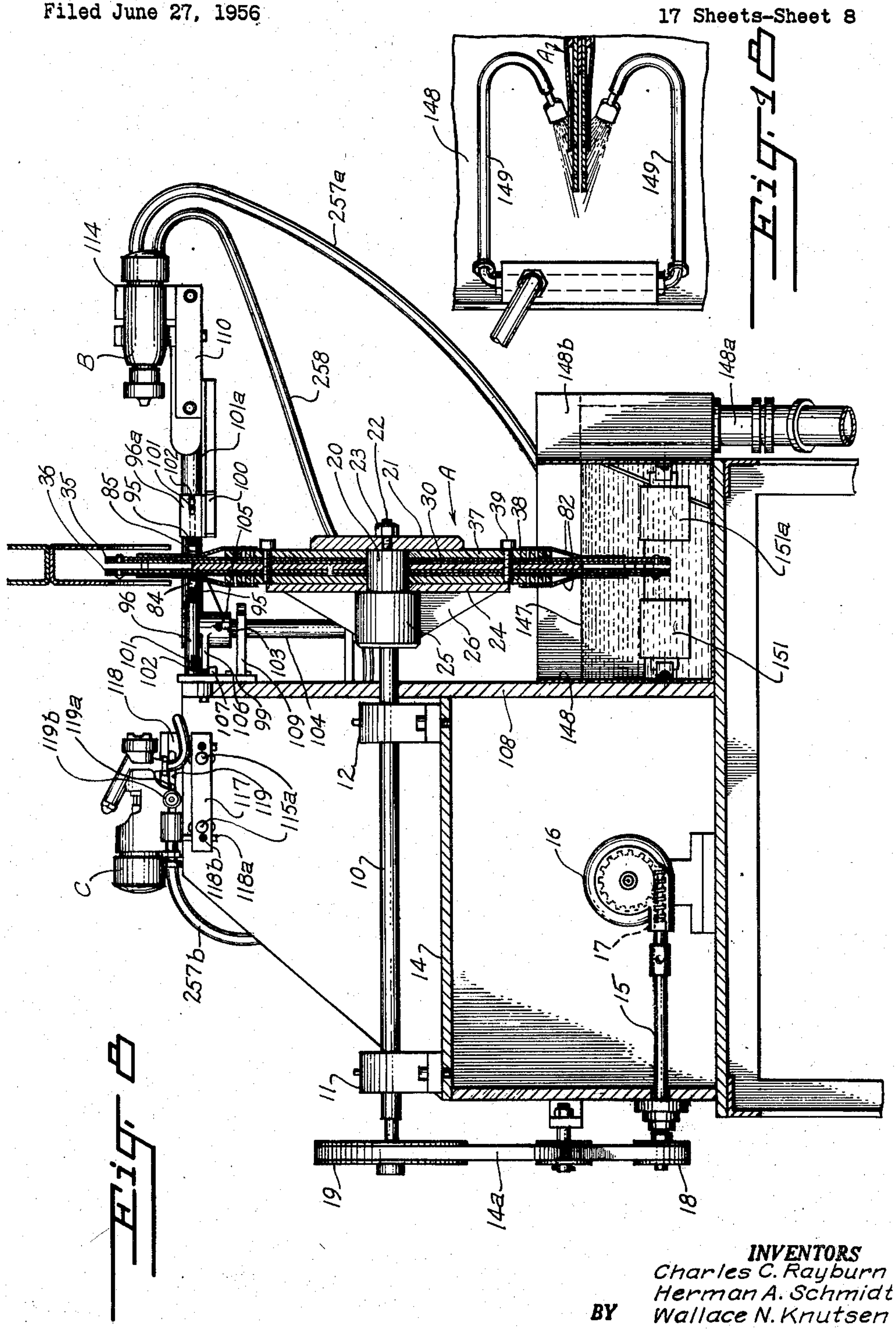
Fig. 8 is a section on line 8—8 of Fig. 2.
Fig. 9 is a horizontal section on line 9—9 of Fig. 2.

After the discharge of the ceramic wafers, the carrier wheel continues to rotate clockwise and is submerged into a washing liquid 147 in the container 148 (Fig. 8). A suitable overflow pipe 148a is provided in lateral discharge compartment 148b for removing excess fluid from the tank 148, this fluid discharging through the perforated intake port 148c into the overflow compartment 148b, as best shown in Fig. 9. The flow pipe 148a will normally discharge into a recovery apparatus designed for the saving of precious metals, such as silver from silver paint. To facilitate the washing operation, transducers 151 and 151a are provided in the washing fluid in the container 148, these transducers being operated by the ultrasonic generator 150, shown in Fig. 3. By the supersonic vibration of the fluid it has been found that the washing operation is greatly facilitated. In addition to the foregoing, jets 149 having inwardly projecting spray nozzles are provided for removing particles from the wheel which might be inclined to cling thereto and which could not be removed by vibration of the fluid as previously described. The arrangement of the jets is shown in Figs. 9 and 18 and the fluid for these jets is preferably at a controlled temperature between 35° and 40° C. for maximum efficiency.

As the carrier wheel leaves the washing fluid in its clockwise direction of travel, it is necessarily saturated with moisture and to eliminate this moisture relatively cool air is projected on the outer surface of the carrier wheel by the cylindrical heads 152 and 153 spaced at each side of the wheel (Fig. 17). These cylindrical heads are each provided with inwardly facing elongated slots 154 from which air is projected at a required velocity against the outer faces of the wheel to remove the moisture therefrom. The heads 152 and 153 have pipe connections 155 with a header 156 which is formed as a lower compartment in communication with a blower 157. The blower 157 also delivers air under pressure to the upper compartment 158 which is provided with an electric heater 159 and the heated air from the compartment 158 is delivered through the relatively thin vertical opening 160 defining a mouth at the end of the converging walls 161 which extend from the upper or heated air compartment 158. This nozzle 160 directs the heated air from the compartment or upper header 158 between the side walls 35 and 36 of the carrier wheel and dries the moisture from the wheel preparatory to its movement to a position for a repeated operation.

For removing dust and particles resulting from the spraying operation, a suction head 165 is provided, this suction head having a vertically adjustable hood 166 formed with recesses 167 at each side to encompass the outer casing of the spray devices. When the hood 166 is lowered, suction will be applied to the area of the wheel and of the wafer and spray machine for removing the particles through the duct 168 which extends downwardly and is connected into a separate chamber 169 provided with the spaced inclined filter plates 170 which separate the dust and particles from the air and return the air into the blower 157 where the air is recycled into the upper and lower headers 156 and 158 for the drying operation.

Figure 22:
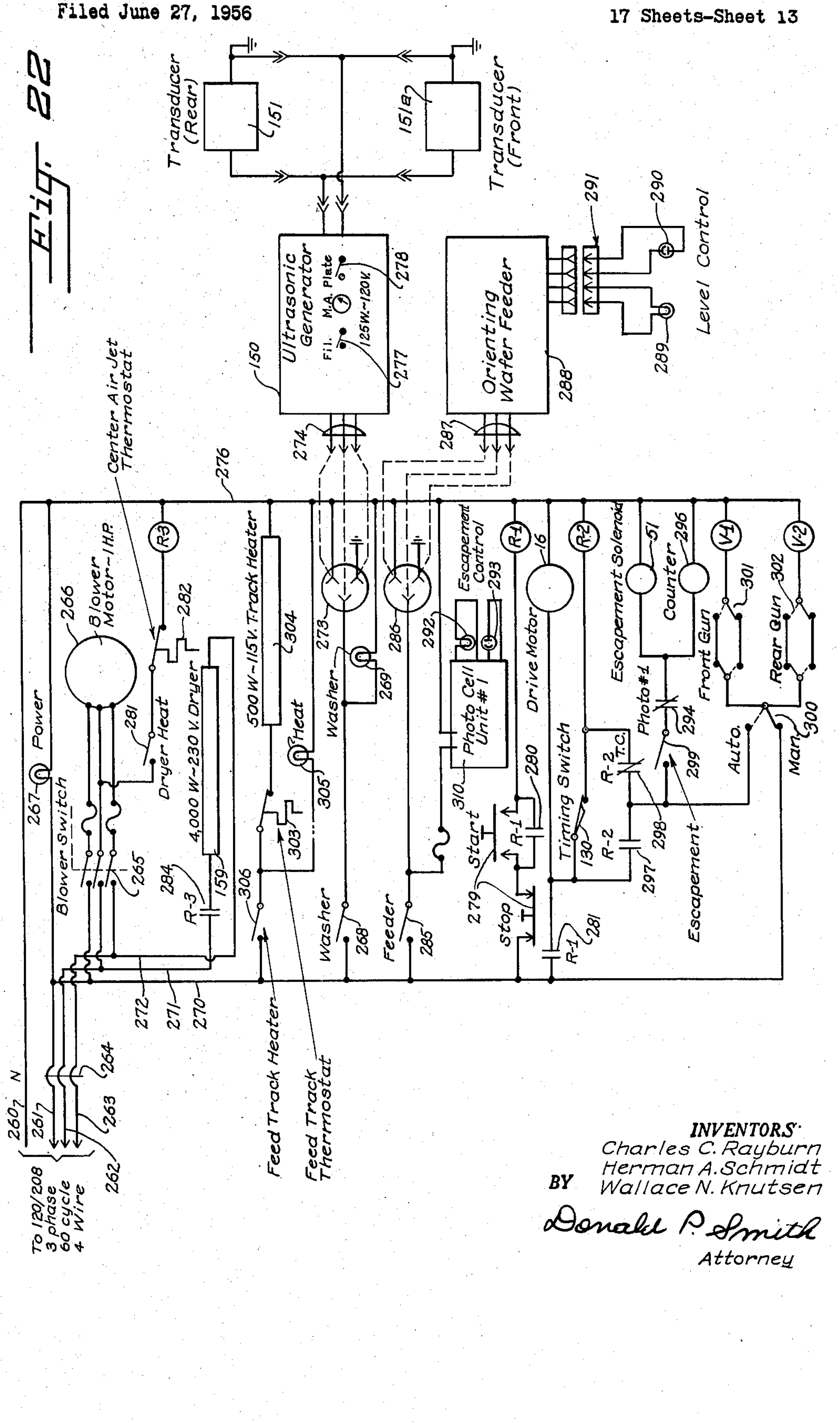
Fig. 22 shows a wiring diagram used in the control operation of the machine.

The control system, whereby the actuation of the various operations incident to spraying a pattern is accomplished in a properly synchronized and automatically repeated sequence, can best be comprehended by reference to Fig. 22 in conjunction with the following descriptive matter. Here the various controls will be described in the order in which actuation will generally occur when the machine is being set up by an operator.

Figure 2:
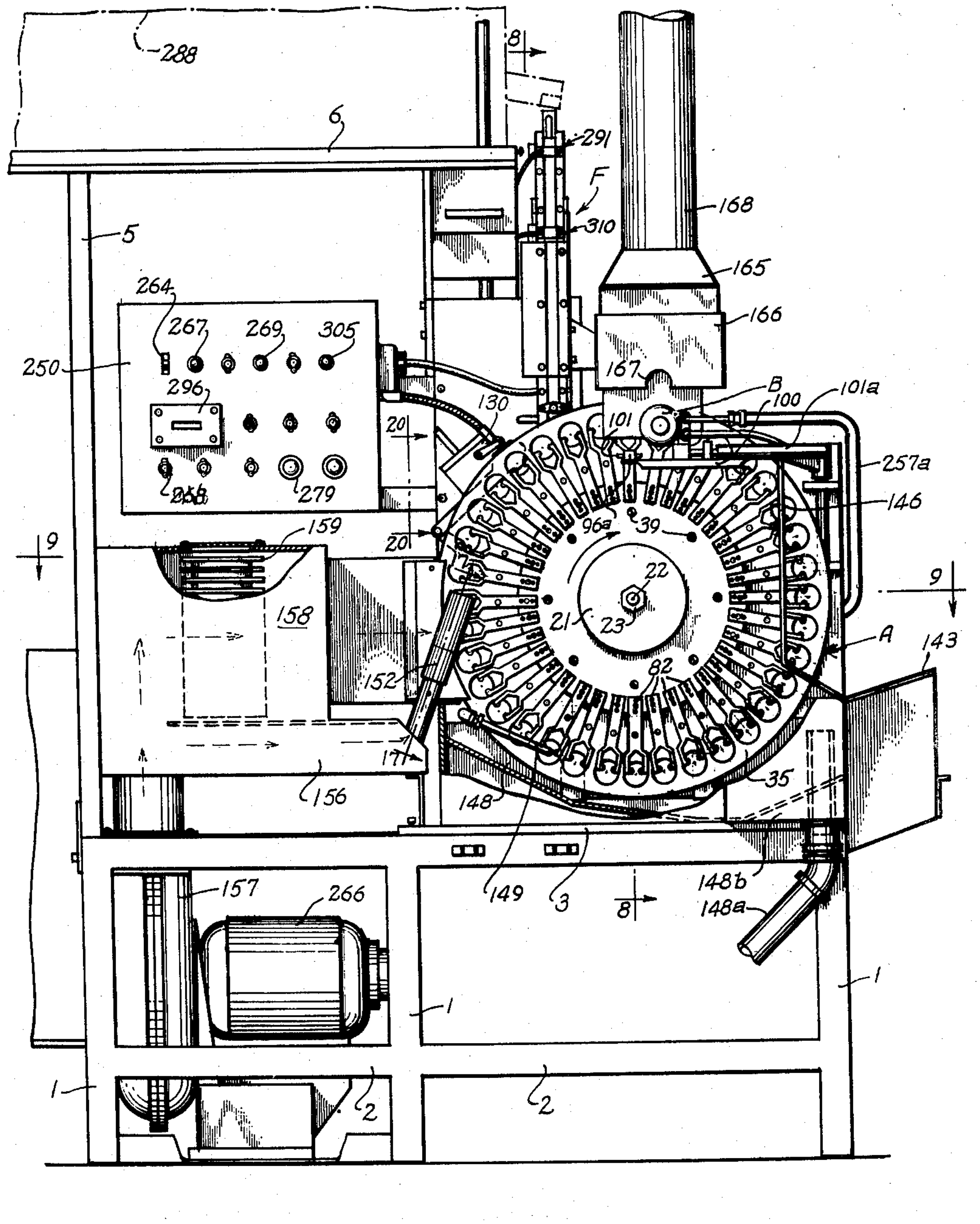
Fig. 2 is a front elevation.

Power for the various components is supplied from a four wire, three phase, alternating current source. The motor 266 powering blower 157 (Fig. 2) utilizes all three phases of the supply voltage. The remainder of the circuit elements operate across single phases of the three-phase source, the loading being distributed so as to draw approximately equal power from each phase.

Energization of the control system from power terminals 261, 262 and 263 is accomplished through circuit breaker switch 264 which is also shown on control panel 250 (Fig. 1). Pilot light 267 indicates the energization of the control system.

In order to maintain the stacked wafers as maintained by photocell unit 292, at a temperature optimum for proper adhesion of the conductive coating, a heater for the stack 304 is connected by switch 306 across power terminals 260 and 261; the temperature is controlled by a series connected thermostat switch 303. Pilot light 305 indicates energization of heater 304.

The ultrasonic generator 150 (Figs. 6 and 22) used in connection with the washing operation is turned on (assuming the washing tank to be full) by manually operated switch 268 connecting it across power terminals 260 and 261 via conductor 270, plug connectors 273 and 274, and conductor 276. Pilot light 269 indicates the energization of ultrasonic generator 150. Separate switches are provided on the generator to control the filament current 277, and plate current 278 for the electron tubes of the generator, so that the plate voltage may be applied only while the filaments are at operating temperature.

The carrier wheel, as generally indicated by reference character A, is set into motion by energization of motor 16 by manual depression of the start switch 279 which energizes relay R–1. Contact 280 of relay R–1 maintains the winding of R–1 energized after the start button is released. Its other contact connects the power from terminal 261 through conductor 270 to drive motor 16; thence back to neutral terminal 260 via conductor 276.

Next in the operation, the blower motor 266 is set into operation by the manual closing of switch 265. Once the blower is operating it is possible to turn on the dryer heater 159 by manually closing switch 281, thereby energizing relay R–3. Contact 284 of relay R–3 connects the dryer heater element 159 across power terminals 262 and 263. A proper air temperature for the blower output is maintained by the use of a thermostatic switch 282 placed in the output air path and electrically connected in series with relay R–3.

Maintenance of a sufficient supply of oriented wafers in the feed slot is accomplished by the use of the orienting wafer feeder, indicated generally by reference character 288 (not forming a part of the instant application), in conjunction with photocell units for sensing the attainment of a proper level of supply and for switching on the feeder only if the supply falls below such level. The manually actuated switch 285 connects single phase power from terminals 261 and 260 through conductors 270 and 276 and connectors 286 and 287 to the feeder 288. Photocell unit 290 contains a switch which is connected in series with the power line to feeder 288. This switch remains closed until the light reaching photocell 290 from lamp 289 is obstructed by a wafer supported at the light screen station by a proper supply of wafers in the chute ahead of it. To prevent the supply of wafers from falling below a level which will allow the proper heating of wafers by retention of a minimum supply in the chute, photocell unit 310 is provided to sense this by the failure of a wafer to block the light reading photocell 293 from light 292. As a result switch 294 opens so as to prevent operation of escapement solenoid 51 until a minimum level is attained. Photocell unit 292 for escapement control is positioned below level control unit 290 on the feeder chute.

Conditioned by the attainment of a proper level of wafer supply through photo unit 292, the feeding escapement performs a repetitive sequence in response to the actuation of micro-switch 130 operated by the rotary motion of the wafer carrier A. Thus, upon closing of switch 130, power is applied to relay R–2 via contact 281 of relay R–1 already closed by the start switch 279. Contact 297 of relay R–2 holds the power on the solenoid coil of relay R–2 after switch 130 opens again, and in addition applied power to the escapement solenoid 51 and counter 296 via switch 299 and also to paint gun valves V–1 and V–2 via switches 300, 301, 302, 304 and 305. Relay R–2 has one contact 298 which, being normally closed, has a pneumatically controlled timer unit which retards its opening by a preset delay. This delay, which is set for a time shorter than that required between arrival of successive cam pockets 31–32–33 in the carrier wheel A, removes the power from relay R–2 and thereby deenergizes the escapement solenoid 51 and paint gun valves V–1 and V–2. The repetitive operation of relay R–2 thus continues with the corresponding cycling of switch 130 without direct attention from the operator of the machine. If desired, the paint spray valves may be manually controlled by using switch 300 on the alternate terminals shown in Fig. 22.

Counter 296, being of conventional design, is used to record the number of pieces passing through the machine which is equal to the number of actuations of the escapement solenoid.

Figure 21:
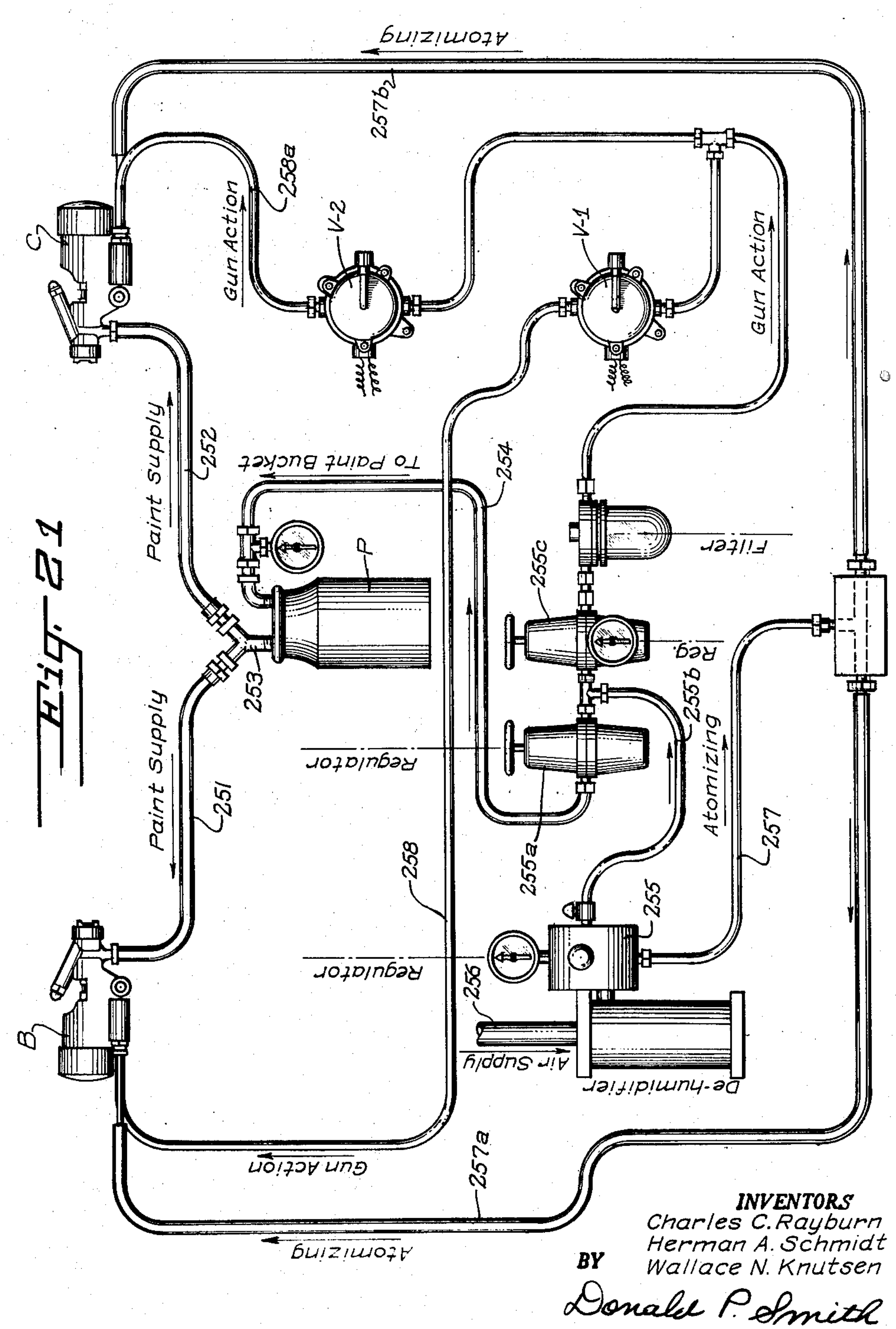
Fig. 21 is a diagram of the pneumatic control for the apparatus.

Fig. 21 shows a layout for a pneumatic system associated with the operation of the apparatus, including the spray guns B and C. These spray guns are connected in the usual way to the paint supply P through the paint supply pipes 251 and 252 connected with the Y 253. The paint supply container P is under pressure through the conduit 254 which passes through the regulators 255 and $255^a$. The fluid pressure is supplied from a suitable source 256 which delivers to the filter interposed between the supply and the regulator 255. A duct 257 connects fluid from the regulator 255 to the atomizing pipes $257^a$ and $257^b$ which are connected with the spray guns B and C. Fluid pressure is also supplied from the regulator 255 through pipe $255^b$ through regulator $255^c$ to the valves V–1 and V–2 for supplying fluid through conduits 258 and $258^a$ for actuating the intermittent discharge from the guns B and C by the electronic controls disclosed in Fig. 22 for intermittently projecting the spray from the guns onto the ceramics.

Figures 24, 28:
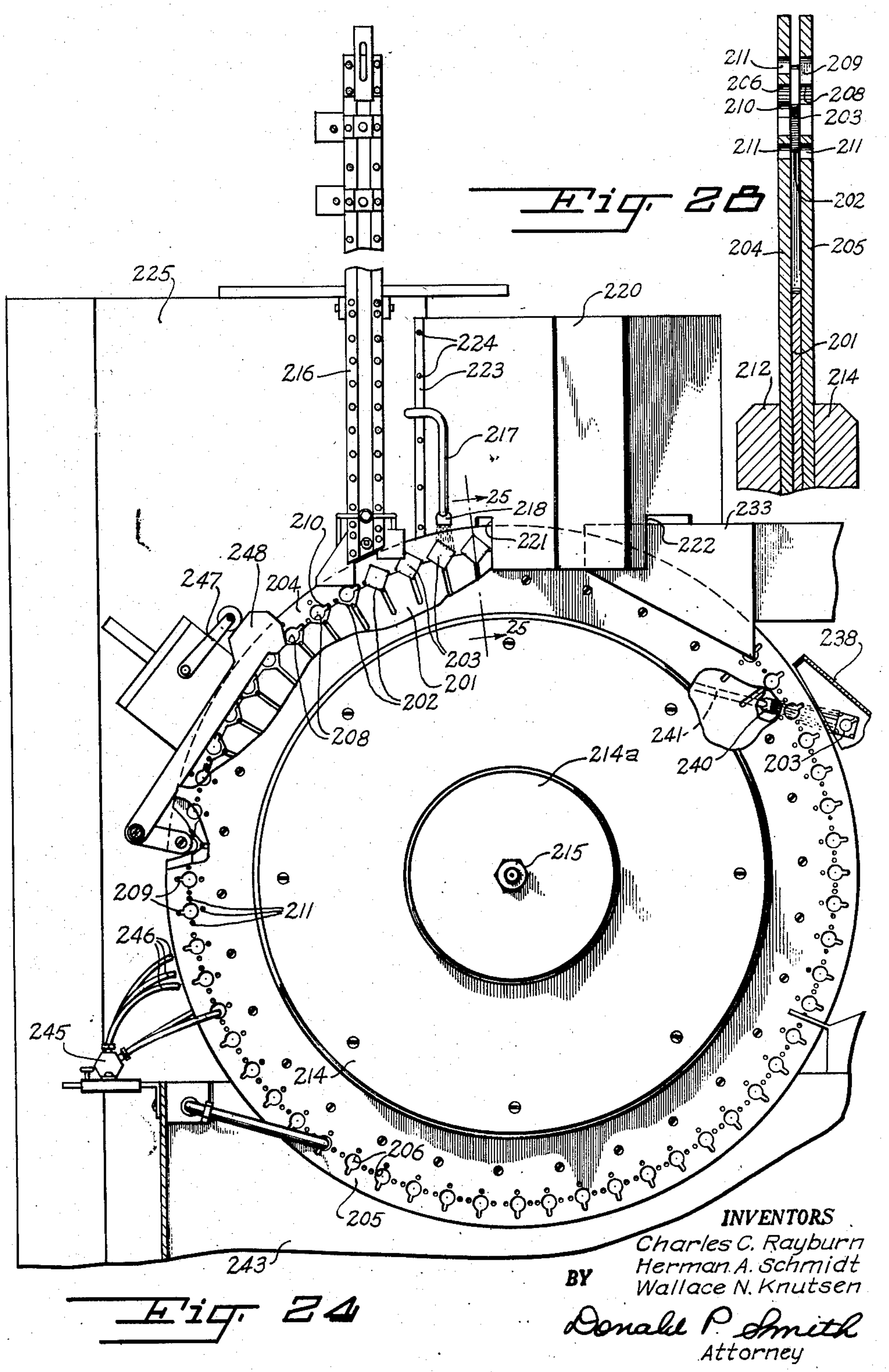
Fig. 24 is an enlarged view of the carrier wheel and associated parts of the modified form of invention shown in Fig. 23.
Fig. 28 is a sectional view on line 28—28 of Fig. 24.

Figs. 23 through 29 show a modified form of the invention particularly adapted to deposit conductive patterns which constitute the plates of a dielectric capacitor. In this disclosure the supporting structure is generally the same as in the preferred form of the invention and includes a support embodying uprights $1^a$, horizontal braces $2^a$ and a platform $3^a$. The platform $3^a$ supporting the structure includes paneling to which operating parts are connected. This modified embodiment includes a carrier in the form of a rotating wheel indicated by reference character 200 and as shown more clearly in Fig. 28, this wheel includes a medial disk 201 formed with angular recesses 202, the walls of which are approximately 90° to receive the ceramic wafers to be coated or printed by the mechanism. It will be understood that in the present form of the invention, as well as in the preferred form of the invention, the recesses for receiving the ceramic wafers will be defined by walls conforming to portions of the wafer so that the latter will firmly seat in the recess during the spraying operation. In the present instance the ceramic wafers being treated are square in form, as shown in Fig. 24 by reference character 203, this form of wafer necessitating the angular recesses heretofore mentioned. The recesses in the medial disk 201 are uniformly spaced to facilitate the cooperation of the feed mechanism which operates intermittently in association with the synchronized spraying operation. The carrier wheel 200 further includes the spaced side plates 204 and 205, these side plates abutting against each side wall of the medial disk 201 and having a greater diameter than the medial disk 201 so that the peripheral edges of the side plates project beyond the recessed medial member.

In the present form of the invention each of the side plates 204 and 205 are formed with pattern openings, the pattern openings in the side plate 204 being indicated by the reference character 206, while the pattern openings in side plate 205 are indicated by reference character 208. These pattern openings 206 and 208 are formed at each side of the wafer receiving recesses formed in the medial disk 201 and the nature of the pattern may be modified in accordance with requirements. In the present instance the two opposite faces of the ceramic wafer 203 are to be sprayed in somewhat different patterns and to illustrate this factor it will be noted that the side plate 205 has its pattern with a tail opening 209 extending vertically while the side plate 204 has its pattern openings 208 formed with the tail opening 210 at approximately 90° from the tail opening 209. Also in the present disclosure each of the patterns embodies symmetrically arranged apertures 211 for the passage of the spray beam for coating the ceramic with circuitry at the four corners of the square body structure. While this pattern has been described in detail in the present development it will be obvious to one skilled in the art that the patterns may be modified by utilization of substitute plates in lieu of plates 204 and 205 and that these substitutes could readily be apertured in any manner desired to secure a required circuitry on the ceramic. The three sections of the carrier wheel assembly are separable and are clamped by discs 212 and 214 which are secured by hub locks 212[a] and 214[a] on the end of a driven shaft by a nut 215 as in the preferred form of the invention.

Figure 23:
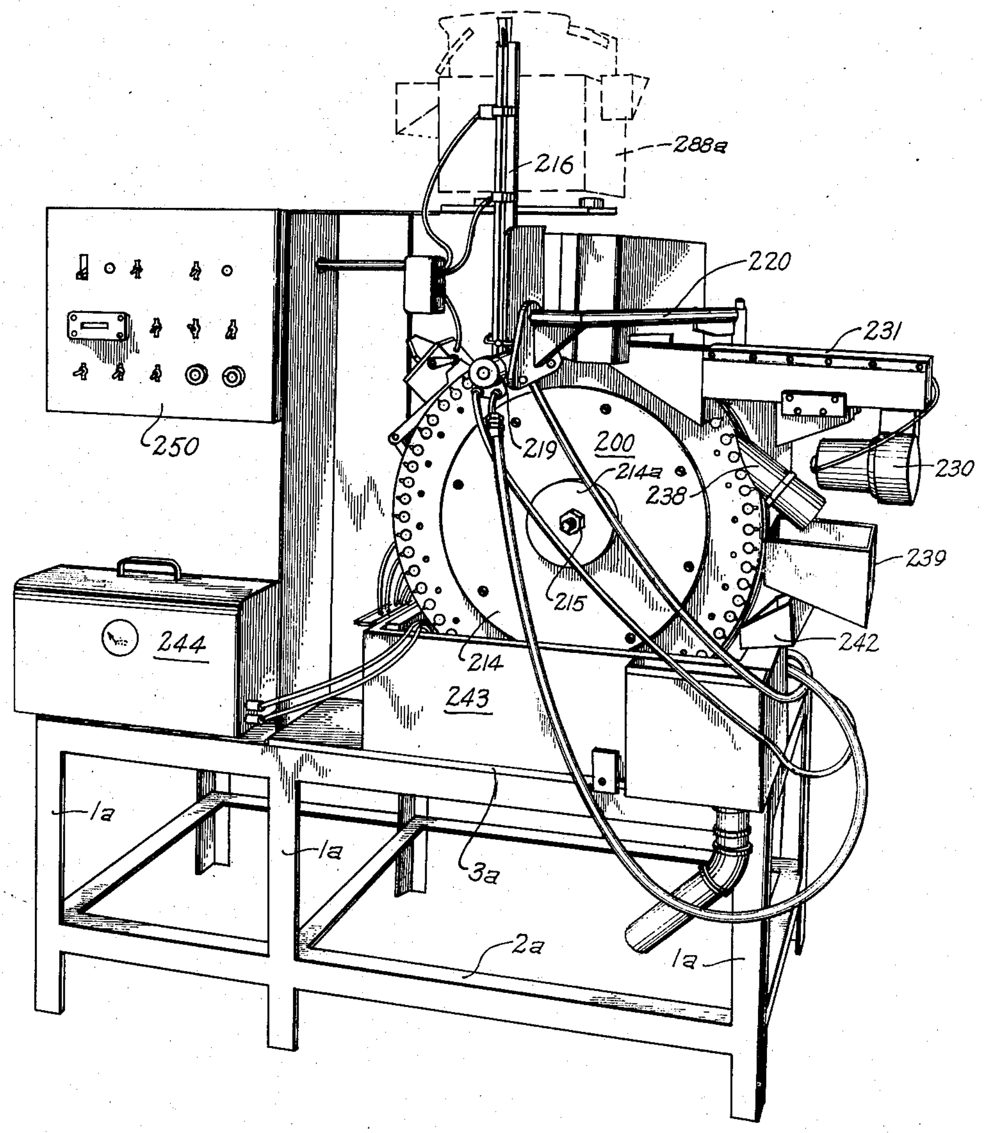
Fig. 23 is a perspective view of a modified form of the invention.

In the modified disclosure it will be noted that the medial plate 201 containing the wafer receiving recesses 202 is of a thickness closely approximating the thickness of the wafer and that the side plates 204 and 205 arranged at each side of the medial plate 201 are so positioned that the free movement of the wafer by the limited tolerances prevailing might under some conditions be interfered with or delayed. To insure the positive and quick seating of each of the ceramic wafers 203 into its respective seat as it is intermittently discharged from the supply chute 216, there is provided a fluid pressure jet 217 including a relatively wide spray nozzle 218 which projects a spray downwardly onto the upper marginal edges of the wafer as it moves with its carrier wheel clockwise towards the spraying positions as determined by oppositely arranged spray guns, one of which is shown at 219 in Fig. 23. These spray guns are mounted in the same general manner as in the preferred form of the invention to provide for horizontal and lateral movement for procuring desirable spraying. In Fig. 23 the spray gun 219 is mounted on the swinging arm 220 and receives its spray material and fluid pressure through suitable connections and from a suitable source, as is conventional with spray guns in general. The spray nozzle 218 is shown as having a sufficient width so that the jet from the nozzle covers an area comprehending a sufficient surface to insure proper movement of the ceramic wafer 203 to its seat, and once seated the ceramic wafer will continue its clockwise movement into position for receiving the spray from the oppositely positioned guns.

Immediately following the spraying position a hood 220 is provided, this hood being slotted at 221 and 222 to enable the hood to embrace each side of the carrier wheel and to permit the carrier wheel to travel therethrough. This hood is fixed along one of its vertical marginal edges 223 by rivets or screws 224 to the vertical panel 225 of the assembly. This hood is for the purpose of confining the free spray vapors from the spray guns during their operation, it being noted that the spray guns will be located to operate immediately after the seating of the ceramic wafer in its proper position by the spray arm 217.

Figures 25, 26, 27:
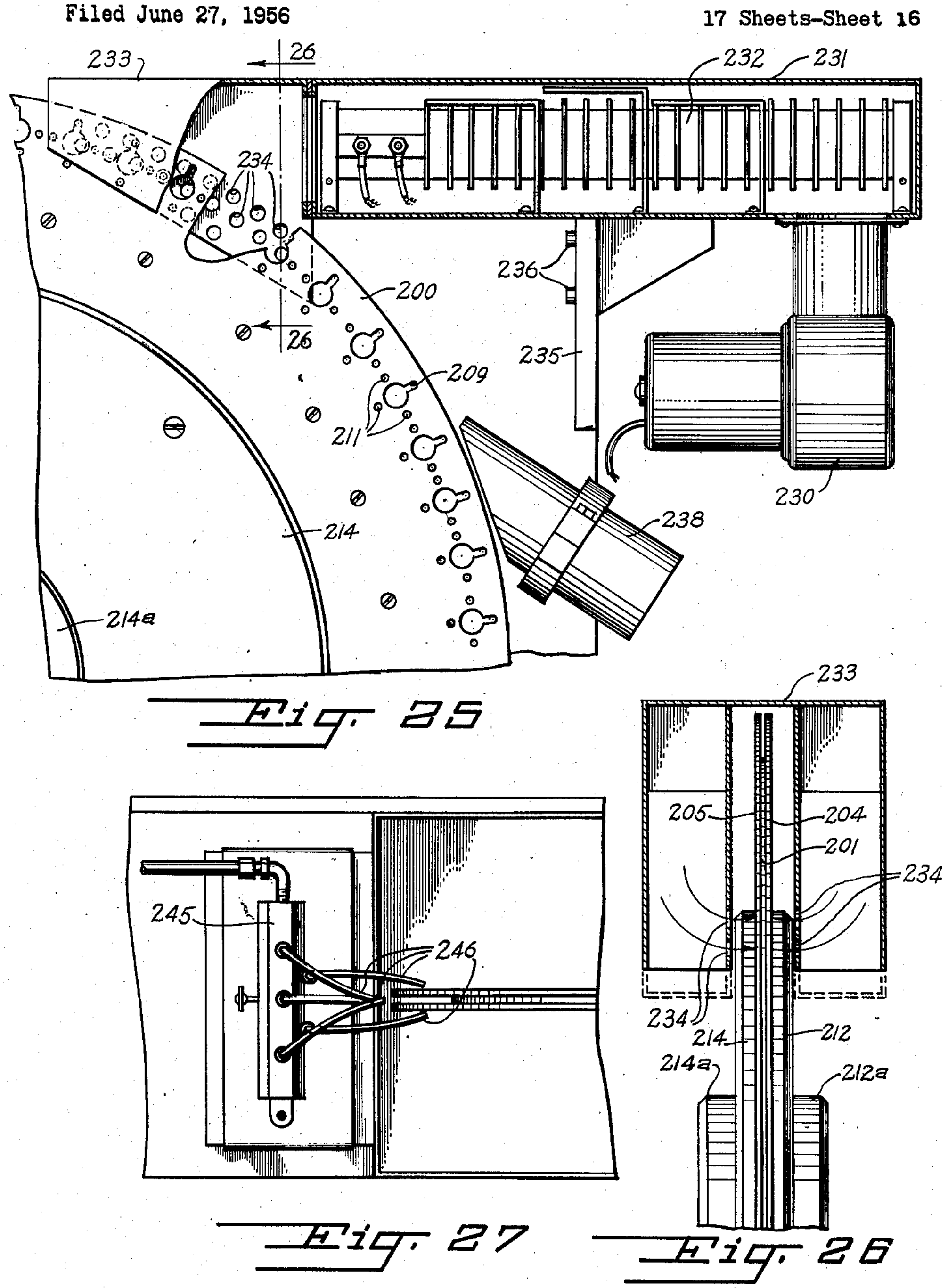
Fig. 25 is a fragmentary sectional view showing the blower and heating mechanism.
Fig. 26 is a sectional view on line 26—26 of Fig. 25.
Fig. 27 is an enlarged elevation of the spray mechanism shown on the modified structure of Fig. 23.
Figure 29:
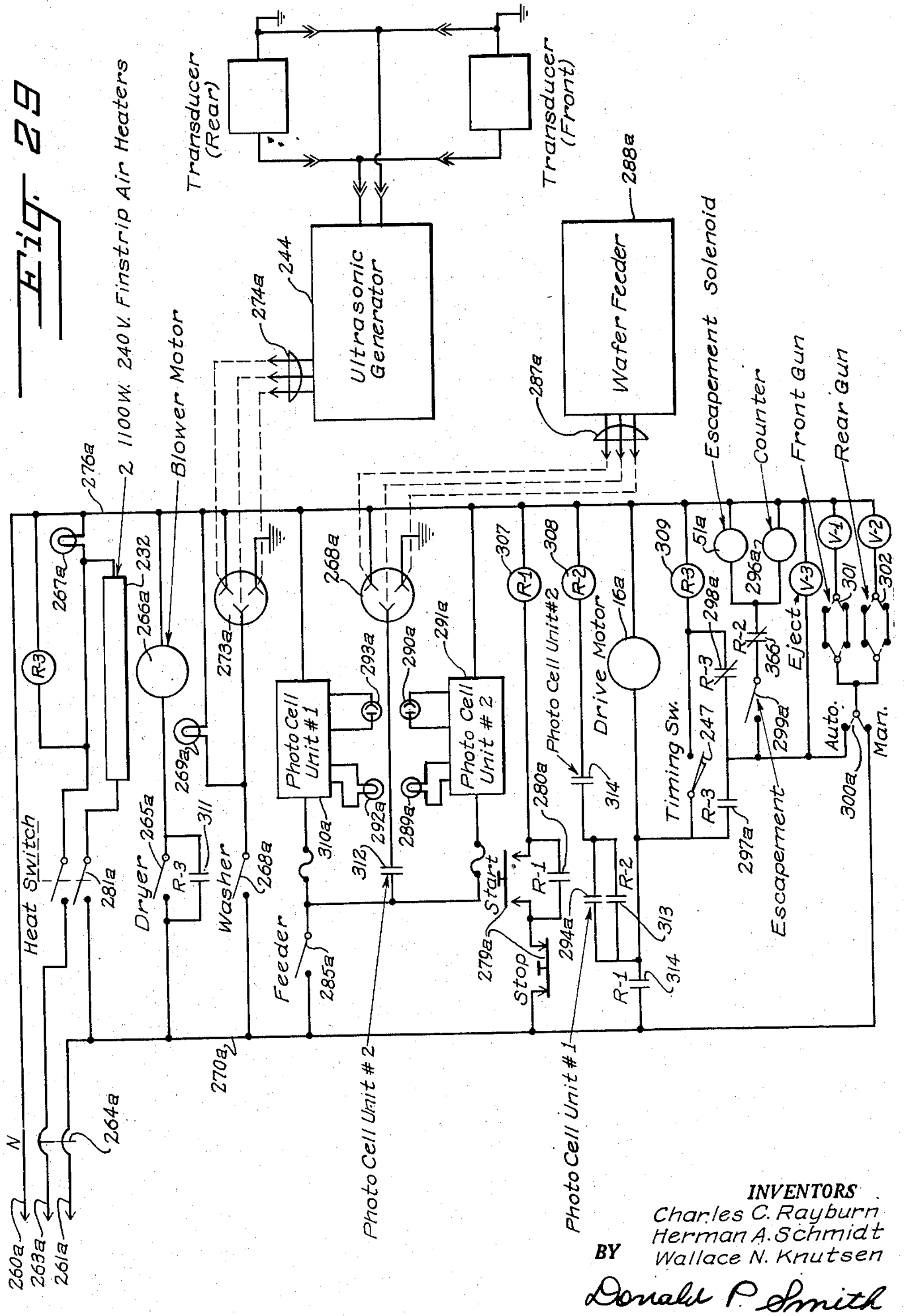
Fig. 29 shows a wiring diagram for the modified form of the invention.

After the spraying operation a drying operation is essential and this drying operation is performed by heated air from the blower 230 which passes through the baffled housing 231 and about the electric heater 232 to the spray head 233 which embraces the carrier wheel, as best shown in Fig. 26, to project heated air through the nozzles 234 against each side of the ceramic wafers being moved clockwise by the carrier after the spraying operation. The bifurcated spray head 233 closely embraces the side plates 204 and 205 about the periphery of the carrier wheel and the perforations 234 for the passage of the heated air are located so that the heated air is projected through the walls of the pattern onto the ceramic wafer and at each side thereof. The drying mechanism for the wafers, after the spraying operation, is supported on an upright plate 235 and fasteners or bolts 236 will secure this plate 235 in position on the frame in a manner to permit its appropriate adjustment to accomplish its function. After the drying operation it is desirable to free the sprayed or printed ceramic wafer from its recess and to discharge the same through a chute 238 into a hopper 239. The chute 238 acts as a guide for discharging the wafers to the hopper 239 and projects generally tangentially of the carrier wheel so that ceramic wafers under urge of a blast of air supplied by a nozzle 240 will be properly discharged. The nozzle 240 is located to discharge air under pressure against the ceramic wafers as they move in their carrier wheel and Fig. 24 shows the appropriate position of the parts and of the movement of the ceramic wafers 203 as they leave the carrier wheel. The spray head 240 for directing the blast of air against the ceramic wafers communicates with a supply pipe 241 from a suitable source and adjustment of these parts to provide maximum efficiency is provided for.

A pan 242 is shown supported on the supporting structure to receive the unejected wafers from the carrier wheel as it moves clockwise towards the bath contained in the receptacle 243, this bath being similar to the bath provided in the preferred form of the invention with the liquid of the bath subject to the operation of the ultrasonic generator 244 whereby the washing operation is carried out. A dryer head is shown at 245 and from this head are a series of nozzles 246 for projecting drying air against the wheel internally and externally after the washing operation so that the wheel is in proper condition for its continuous automatic operation.

As in the previous form of the invention, the parts are automatically controlled for synchronized actuation by a master switch 247 operated by the pivoted arm 248 actuating in the pockets which receive the ceramic wafers, the walls defining the pockets of the wafer-receiving recesses forming uniformly spaced actuating cams for operating the head of the arm 248 which in turn operates the control switch 247. A control and indicator panel is shown at 250 at the front of the machine for the convenience of the operator.

For operation of the machine in its modified form shown in Figs. 23 to 29, inclusive, for depositing conductive patterns which constitute the plates of a solid dielectric capacitor, a control circuit differing somewhat from that described in conjunction with Fig. 22 is provided. Referring now to the modified control circuit of Fig. 29, components having functionality identical to a corresponding component in the first control system of Fig. 22 have the same numerical designation plus the suffix "a."

For the modified circuit, power is supplied from a single phase, three wire, alternating current source to terminals 261ª and 263ª with neutral terminal 260ª. Circuit breaker switch 264ª is provided to connect the power source to the overall system.

In setting up the modified machine power is first applied to the ultrasonic washer 244 from power terminals 261ª and 260ª through conductor 270ª, manually actuated washer switch 268ª, connectors 273ª and 274ª, and conductor 276ª. A pilot lamp 269ª indicates to the operator the application of power to the washer.

The carrier wheel 200 is set into motion by energization of motor 16ª by manual depression of the start switch 279ª which energizes relay R–1. Contact 280ª of relay R–1 maintains the solenoid winding of R–1 energized after the start button is released. Its other contact connects the power from terminals 261ª through conductor 270ª to drive motor 16ª; thence back to neutral terminal 260ª via conductor 276ª.

Heating coils for the paint-drying air 232 are then energized by manual closing of switch 281ª; this action also energizes pilot lamp 267ª and relay R–3. Through contact 311 of relay R–3 the air-blower motor 266ª is energized if it has not already been energized by the manual closing of switch 265ª. In this way overheating of the electric resistance element 232 by operation without the forced air supply is prevented.

As in the unmodified machine, maintenance of a sufficient supply of oriented wafers in the feed slot is accomplished by the use of the wafer feeder, indicated generally by reference character 288ª, in conjunction with photocell units for sensing the attainment of a proper level of supply for switching on the feeder only if the supply falls below such level. The manually actuated feeder-switch 285ª connects single phase power from terminals 261ª and 260ª through conductors 270ª and 276ª and connectors 286ª and 287ª to the feeder 288ª. Photocell unit 291ª contains a switch 312 which is connected in series with the feeder switch 285ª to the feeder 288ª. The switch 312 remains closed until the light reaching photocell 290ª from lamp 289ª is obstructed by a wafer supported at the light screen station by a proper supply of wafers in the chute. Should the supply of wafers for some reason fall below the level required for operation, photocell unit 310ª senses this by the failure of a wafer to block the light reading photocell 293ª from light 292ª, thus closing switch 294ª so as to energize relay R–2. Contact 313 of relay R–2 holds the power on R–2 after contact 294ª is opened by the build-up of the wafer supply above the station of photocell unit 310ª. Normally closed contact 306 of relay R–2 opens thus suspending the operation of escapement solenoid 51ª until the wafer level reaches the station of photocell unit 291ª, whereby contact 314 is opened and the power is removed from relay R–2. Contact 306 of relay R–2 then closes and the escapement resumes operation.

In the modified control system, the feeding escapement performs a repetitive sequence in response to the actuation of switch 247 operated by the rotary motion of the capacitor carrier 200. Thus, upon closing of switch 247, power is applied to relay R–3, via contact 314 of relay R–1 already closed by the start switch 279ª. Contact 297ª of relay R–3 holds the power on the solenoid coil of relay R–3 after switch 247 opens again, and in addition applies power to the escapement solenoid 51ª and counter 296ª via switch 299ª and also to paint gun valves V–1ª and V–2ª via switches 300ª, 301ª and 302ª. Relay R–3 has one contact 298ª which, being normally closed, has a pneumatically-controlled timer unit which retards its opening by a preset delay. This delay, which is set for time shorter than that required between arrival of successive cam pockets, removes the power from relay R–3 and thereby deenergizes the escapement solenoid 51ª and paint gun valves V–1ª and V–2ª. The repetitive operation of relay R–3 thus continues with the corresponding cycling of switch 247 without direct attention from the operator of the machine. If desired, the paint spray valves may be manually controlled by using switch 300ª on the alternate terminals shown in Fig. 29.

Counter 296ª being of conventional design is used to record the number of pieces passing through the machine which is identical with the number of actuations of the escapement solenoid.

In the modified system energization by the timing switch of relay R–3 also energizes the air valve V–3 for seating and ejection of the capacitors into the catch bucket at the proper station of the carrier wheel 200.

What we claim is:

1. In an apparatus for spray printing patterns on ceramic wafers, a supporting frame, a traveling carrier for said wafers mounted on said frame, said carrier being provided with a plurality of recesses for supporting said wafers, means for feeding wafers to said carrier, pattern holding means supported by said carrier at opposite sides of the recesses, patterns supported in said holding means, means for alternately moving the ceramic wafers in said recesses laterally to opposite sides for abutting association with oppositely disposed ones of said patterns, spray guns positioned at opposite sides of said patterns, means synchronized with said ceramic wafer moving means to operate said spray guns for projecting spray through said patterns onto the opposite faces of the ceramic wafers as said wafers are alternately moved into engagement with said patterns.

2. In an apparatus for spray printing patterns on ceramic wafers, a supporting frame, a traveling carrier for said wafers mounted on said frame, said carrier comprising a medial disk formed with a plurality of recesses for supporting said wafers, means for feeding wafers to said carrier, said feeding means being controlled by said carrier, pattern holding means supported by said carrier at opposite sides of the recesses, patterns supported in said holding means, means for alternately moving the ceramic wafers in said recesses laterally to opposite sides for abutting association with said patterns, and a plurality of spray guns, a different one of said spray guns positioned on each side of said carrier disk, said spray guns being staggered along the periphery of said carrier disk for projecting spray through adjacent ones of said patterns onto the opposite faces of the ceramic wafers as they are alternately moved into engagement with said patterns.

3. In an apparatus for spray printing patterns on ceramic wafers, a supporting frame, a rotating wheel for receiving and moving wafers in the path of a projected spray, said wheel comprising a medial disk having wafer-receiving notches uniformly formed in its peripheral edge and lateral inner and outer plates of laminated form at each side of the medial disk, said lateral plates projecting beyond the peripheral edge of said medial disk and having pattern receiving openings about their marginal edge portions opposite the notches in the medial disk, said openings being of smaller diameter in the inner plates to provide outer marginal portions, and patterns of disk form for association with said openings, said patterns including marginal flanges for abutting association with the marginal portions defining the openings in the inner plates.

4. The structure of claim 3 characterized in that means are provided for clamping the pattern flanges in fixed position.

5. The structure of claim 3 characterized in that the medial disk is of a thickness greater than the thickness of the ceramic wafers to permit lateral movement of the wafers when seated in their notches, and means for automatically shifting the ceramic wafers laterally against the patterns located in the lateral plates.

6. The structure of claim 3 characterized in that the medial disk is of a thickness greater than the thickness of the ceramic wafers to permit lateral movement of the wafers when seated in their notches, and means supported by the lateral plates for automatically shifting the ceramic wafers laterally against the patterns located in the lateral plates.

7. The structure of claim 3 characterized in that the medial disk is of a thickness greater than the thickness of the ceramic wafers to permit lateral movement of the wafers when seated in their notches, and means in the form of spring arms having extensions projecting through the patterns for engaging the wafers to shift the same laterally for abutting association with the patterns at predetermined intervals.

8. The structure of claim 3 characterized in that a spray gun is located at one side of said wheel and an arm is pivoted to the frame and engages with the wafer-receiving notches in the medial disk for intermittent movement for actuating said spray gun.

9. In an apparatus for spray printing patterns on ceramic wafers, a supporting frame, a rotating wheel for receiving and moving wafers in the path of a projected spray, said wheel comprising a medial disk having wafer receiving notches uniformly arranged in its peripheral edge and lateral plates at each side of the medial disk, said lateral plates being formed with openings defining patterns laterally of each of the notches to permit the passage of the projected spray onto wafers on the disk, pneumatic means for seating the wafers in the notches in said disk, and pneumatic means for ejecting the wafers after the spraying operation.

10. The structure of claim 9 characterized in that means are provided for projecting heated air through each of the lateral plates onto the wafers after the spraying operation and prior to their ejection from the rotating wheel.

11. The structure of claim 9 characterized in that the lateral plates are in the form of disks which are removably clamped against the outer faces of the medial disk.

12. The structure of claim 9 characterized in that the lateral plates are provided with spaced perforations about the pattern forming openings to permit the passage of a drying fluid onto the wafers after the spraying operation.

13. The structure of claim 9 characterized in that power means are provided for supplying the paint and drying fluid to the wafers and such power means is controlled by a switch actuated by a pivoted arm engaging in the notches of the medial disk.

14. The structure of claim 9 characterized in that the pneumatic means for seating the wafers in the notches in the disk includes a fluid pipe terminating in a relatively broad nozzle lying in the plane of the rotating wheel and positioned to direct spray vertically downwardly onto the wafers and between the lateral plates.

15. The structure of claim 9 characterized in that the pneumatic means for ejecting the wafers after the spraying operation includes a nozzle directing fluid under pressure through the openings formed in the lateral plates and in the direction of the periphery of the wheel.

16. An apparatus for spray printing patterns on ceramic wafers comprising a supporting frame, a driven shaft mounted on said frame, a carrier wheel mounted on said shaft, said carrier wheel being provided with a plurality of ceramic-receiving pockets about its peripheral portion, pattern holding means carried by said wheel at each side of each of said ceramic-receiving pockets, a different pattern mounted within each one of said pattern holding means, means for intermittently feeding ceramic wafers to said pockets, spray guns arranged at each side of said wheel and positioned for projecting spray through said patterns to the opposite faces of wafers arranged in said pockets as said wheel is moved into the path of the spray from the guns, means for intermittently actuating said spray guns and operated by the movement of said wheel on said shaft to paint said wafers, means for delivering painted wafers from said wheel, means for washing said wheel after discharge of wafers from their pockets, means for drying said wheel prior to the feeding of additional wafers to said pockets for spraying, and means for alternately clamping the opposite faces of ceramic wafers against opposite ones of said patterns during said spraying operation.

17. An apparatus for spray printing patterns on ceramic wafers comprising a supporting frame, a driven shaft mounted on said frame, a carrier wheel mounted on said shaft, said carrier wheel being provided with a plurality of ceramic-receiving pockets about its peripheral portion, pattern holding means carried by said wheel at each side of each of said ceramic-receiving pockets, a different pattern mounted within each one of said pattern holding means, means for intermittently feeding ceramic wafers to said pockets, spray guns arranged at each side of said wheel and positioned for projecting spray through said patterns to the opposite faces of the wafers arranged in said pockets as said wheel is moved into the path of the spray from the guns, means for intermittently actuating said spray guns and operated by the movement of said wheel on said shaft to paint said wafers, means for delivering painted wafers from said wheel, means for washing said wheel after discharge of wafers from their pockets, means for drying the wheel prior to the feeding of additional wafers to said pockets for spraying, spring arms mounted on said carrier wheel at opposite sides of each one of said ceramic-receiving pockets, and cams for actuating said spring arms to alternately clamp the opposite faces of wafers against opposite ones of said patterns in each of said ceramic receiving pockets as said wafers are moved into spraying position.

References Cited in the file of this patent

UNITED STATES PATENTS

| | | |
|---|---|---|
| 1,188,648 | Hastings | June 27, 1916 |
| 2,015,437 | Novick | Sept. 24, 1935 |
| 2,206,673 | Radtke | July 2, 1940 |
| 2,610,578 | Paasche | Sept. 16, 1952 |